(12) United States Patent
Bharadwaj et al.

(10) Patent No.: US 12,445,381 B2
(45) Date of Patent: Oct. 14, 2025

(54) STORAGE AWARE CONGESTION MANAGEMENT

(71) Applicant: Cisco Technology, Inc., San Jose, CA (US)

(72) Inventors: Harsha Bharadwaj, Bangalore (IN); Ramesh Sivakolundu, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 720 days.

(21) Appl. No.: 17/870,578

(22) Filed: Jul. 21, 2022

(65) Prior Publication Data

US 2024/0031295 A1 Jan. 25, 2024

(51) Int. Cl.
*H04L 47/193* (2022.01)
*G06F 3/06* (2006.01)
*H04L 47/263* (2022.01)

(52) U.S. Cl.
CPC .......... *H04L 47/193* (2013.01); *G06F 3/0613* (2013.01); *G06F 3/0659* (2013.01); *G06F 3/067* (2013.01); *H04L 47/263* (2013.01)

(58) Field of Classification Search
CPC ...... G06F 3/0613; G06F 3/0659; G06F 3/067; G06F 3/0635; H04L 47/193; H04L 47/263
See application file for complete search history.

(56) References Cited

U.S. PATENT DOCUMENTS

| 10,972,370 B1 | 4/2021 | Peschka |
| 2005/0188109 A1 | 8/2005 | Shiga et al. |
| 2015/0378932 A1* | 12/2015 | Souri ............... G06F 21/79 |
| | | 711/209 |
| 2017/0364266 A1* | 12/2017 | Xu ................ G06F 3/0688 |
| 2018/0095915 A1 | 4/2018 | Prabhakar et al. |
| 2019/0101880 A1* | 4/2019 | Guim Bernat ...... G06F 12/0238 |
| 2019/0386924 A1 | 12/2019 | Srinivasan et al. |
| 2020/0036624 A1 | 1/2020 | Michael et al. |

(Continued)

FOREIGN PATENT DOCUMENTS

CN 110262754 B 9/2019

OTHER PUBLICATIONS

Gu W., et al., "Alleviating Performance Interference Through Intra-Queue I/O Isolation for NVMe-over-Fabrics", IFIP International Federation for Information Processing 2022, Dec. 1, 2022, Retrieved from https://link.springer.com/chapter/10.1007/978-3-031-21395-3_26 on Sep. 25, 2023, 13 Pages, Entire Document, Especially, Abstract, FIG.2,4, p. 3, First Para—p. 7, Second Para.

(Continued)

*Primary Examiner* — Khoa Huynh

(74) *Attorney, Agent, or Firm* — Lee & Hayes, P.C.

(57) ABSTRACT

A method of congestion mitigation may include determining whether a host is sending a read command or a write command to an NVMe controller, and in response to a determination that the host is sending the read command, transmitting the read command via a first transmission control protocol (TCP) connection between the host and the NVMe controller. The method may further include in response to a determination that the host is sending the write command, transmitting the write command via a second TCP connection between the host and the NVMe controller.

20 Claims, 11 Drawing Sheets

(56) References Cited

U.S. PATENT DOCUMENTS

| | | |
|---|---|---|
| 2020/0084150 A1 | 3/2020 | Burstein et al. |
| 2020/0326879 A1 | 10/2020 | Zhang et al. |
| 2020/0358701 A1 | 11/2020 | Su |
| 2021/0211347 A1 | 7/2021 | Vasseur et al. |
| 2021/0352138 A1 | 11/2021 | Kodavanty et al. |
| 2021/0365209 A1 | 11/2021 | L'Ecuyer et al. |
| 2022/0052905 A1 | 2/2022 | Vasseur et al. |

OTHER PUBLICATIONS

PCT Search Report and Written Opinion mailed Oct. 19, 2023 for PCT application No. PCT/US23/28074, 12 pages.

International Preliminary Report on Patentability for International Application No. PCT/US2023/028074, Dated Jan. 30, 2025, 10 pages.

Sagi Grimberg, Bringing NVMe/TCP Up to Speed, downloaded on Jul. 21, 2022 from https://nvmexpress.org/wp-content/uploads/Bringing-NVMe-over-TCP-Up-To-Speed.pdf, 20 pages.

* cited by examiner

STORAGE AWARE CONGESTION MANAGEMENT

TECHNICAL FIELD

The present disclosure relates generally to network storage management. Specifically, the present disclosure relates to systems and methods for managing congestion or read and write processes within a datacenter host system.

BACKGROUND

Computing devices and systems are ubiquitous, and the transmission of data between two or more computing devices is equally ubiquitous. As data is transmitted between computing devices (e.g., between a host and a storage system), the amount of data may be more than what a fabric or link may handle. This results in fabric congestion where the quality of service (QoS) is reduced. Fabric congestion may include queueing delays, packet loss, and/or the blocking of new connections. Applications executed on a computing system may not be aware if input/output (I/O) is serviced by a local storage or a remote storage via a fabric. The I/O transactions from an application are neither metered nor flow controlled, and, as a result, congestion is an unavoidable reality when I/Os are transported over any fabric transport. Congestion may occur either in a fabric or inside a storage controller.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Non-volatile memory express (NVMe) is a next-generation storage protocol that may be used in place of small computer system interface (SCSI) protocols as the protocol used in connection with all-flash storage arrays. NVMe may include any logical-device interface specification for accessing non-volatile storage media of a computing device. The associated storage device may include a NAND flash memory that comes in several physical form factors, including solid-state drives (SSDs), PCIe add-in cards, M.2 cards, and other types of flash memory. NVMe, as a logical-device interface, may benefit from the low latency and internal parallelism of solid-state storage devices.

Further, NVMe/transmission control protocol (TCP) is included among the latest specifications and protocols for transporting NVMe over fabrics (NVMeoF). As used in the present specification and in the appended claims, the term "fabric" is meant to be understood broadly as any mesh of connections between network devices such as access points, switches, and routers that transports data to its destination, and may include the physical wirings that make up these connections and/or a virtualized, automated lattice of overlay connections on top of the physical topology.

A number of performance-sensitive enterprise applications using block storage may be deployed in dedicated storage area network (SAN) fabrics. As part of a SCSI to NVMe technological migration, some of SANs may be expected to upgrade from internet small computer systems interface (iSCSI) or FibreChannel to an NVMe/TCP based fabric.

Figure 1:
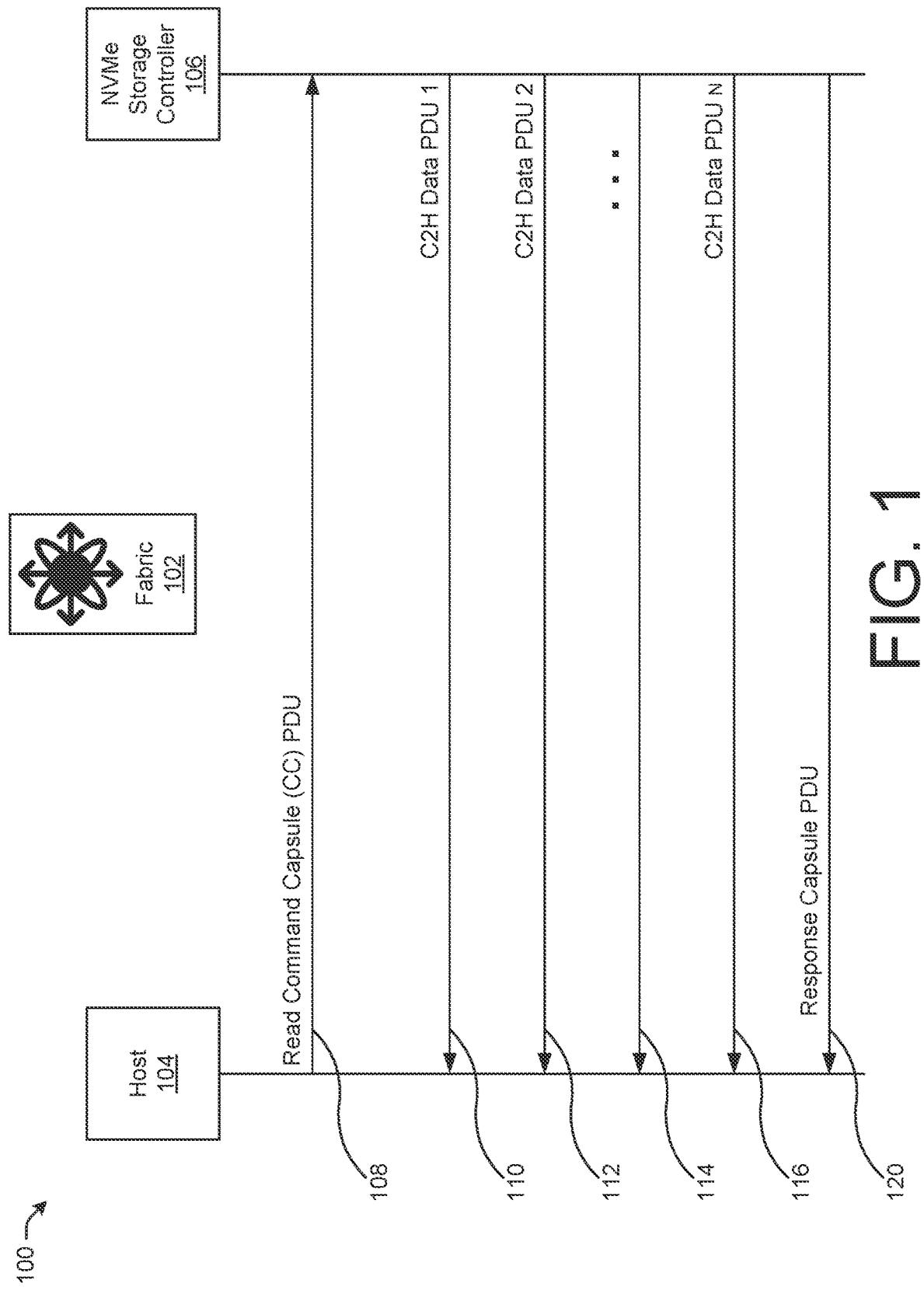
FIG. 1 illustrates a call flow diagram of protocol data units (PDUs) operations in the context of read I/Os, according to an example of the principles described herein.
Figure 2:
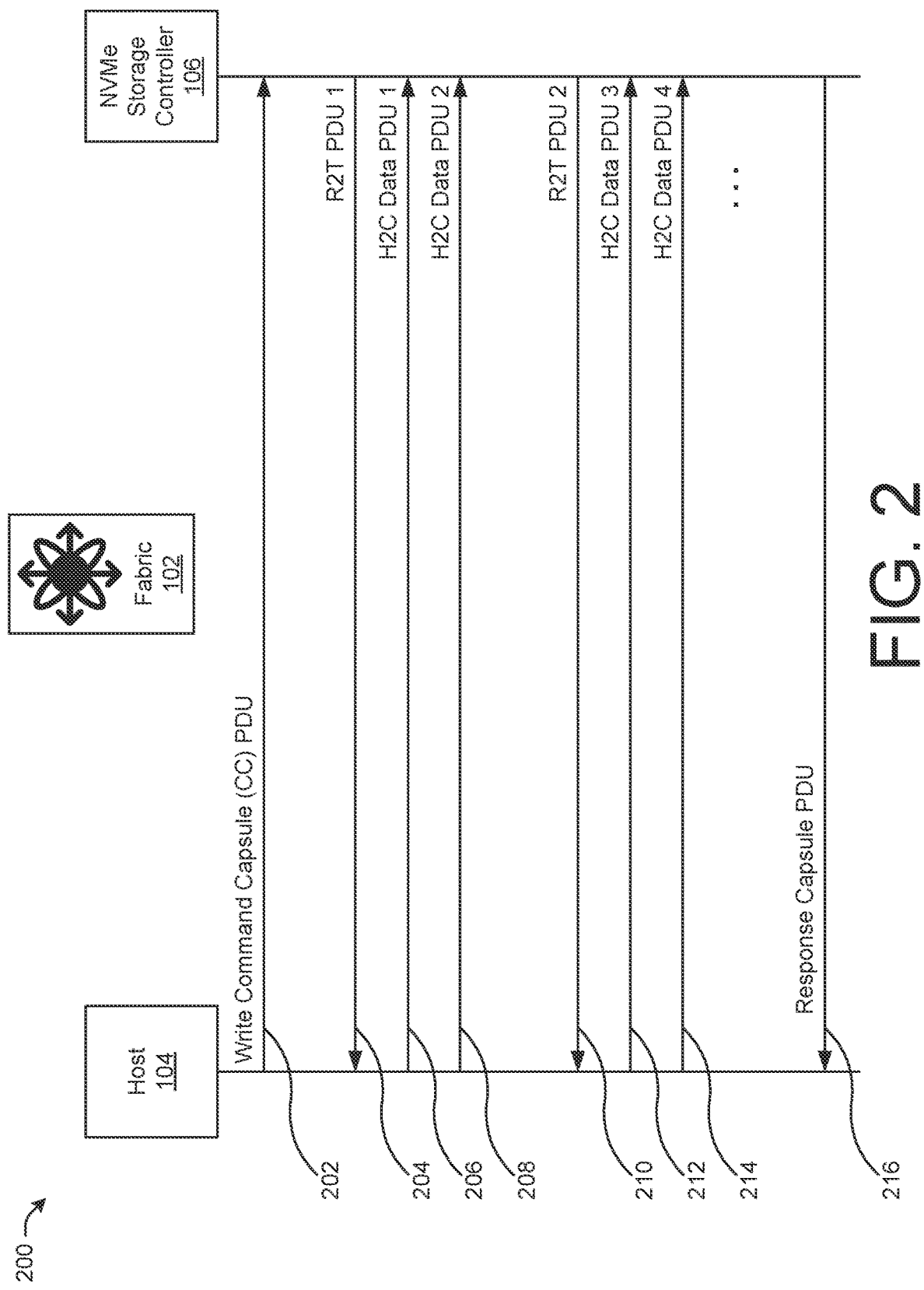
FIG. 2 illustrates a call flow diagram of protocol data units (PDUs) operations in the context of write I/Os, according to an example of the principles described herein.

A host computing device and an NVMe storage controller may exchange NVMe/TCP protocol data units (PDUs) that encapsulate protocol messages of NVMe I/O operations. The relevant PDUs may include the following: CapsuleCommand (Read/Write), CapsuleResponse (Read/Write Responses), H2CData (Data from Host to Controller), C2HData (Data from Controller to Host) and R2T (Ready to Transmit). The operations of these PDUs in context of read and write I/Os are depicted in FIGS. 1 and 2. FIG. 1 illustrates a call flow diagram 100 of protocol data units (PDUs) operations in the context of read I/Os, according to an example of the principles described herein. FIG. 2 illustrates a call flow diagram 200 of protocol data units (PDUs) operations in the context of write I/Os, according to an example of the principles described herein. As depicted in FIGS. 1 and 2 a host computing device 104 may communicate with an NVMe storage controller 106 via a fabric 102. At 108, the host 104 may transmit a read command capsule (CC) PDU to the NVMe storage controller 106. The NVMe storage controller 106 may, at 110, 112, 114, 116, send "N" number of controller-to-host (C2H) data PDUs, where N is any integer greater than or equal to 1, followed by a response capsule PDU at 120. The read/write examples described herein are with respect to NVMe/TCP. However, the present systems, methods, and non-transitory computer-readable medium may be applied in any networking environment.

At FIG. 2, a write CC PDU may be sent from the host 104 to the NVMe storage controller 106 at 202. The NVMe storage controller 106 may, at 204, send a first ready-to-transmit (R2T) PDU (R2T PDU 1), and the host 104 may reply at 206, 208 with a number of host-to-controller (H2C) data PDUs. A second round of write commands may begin with a second R2T PDU (R2T PDU 2), followed with the host 104 replying at 212, 214 with a number of H2C data PDUs. At 216, the NVMe storage controller 106 may send a response capsule PDU.

The NVMe reads and writes as exemplified in FIGS. 1 and 2 may have different characteristics. A first difference may include, from a fabric traffic flow perspective, the reads and writes may have a dichotomous relationship. The reads are data heavy in the receive (Rx) direction of the host 104 acting as an initiator. The writes, in contrast, are data heavy in the transmit (Tx) direction of the host 104 as depicted in FIG. 2. For example, a 64 Kb read command may result in only one 128 byte frame (e.g., Read CC PDU) Tx from the host 104, but with more than 64 Kb worth of frames (C2H Data PDUs) Rx towards host 104 in response. A 64 Kb write may have an opposite traffic pattern.

A second difference may include, from a flash storage perspective, the writes may be subject to wear and amplification which introduces variability in write completion times. In contrast, reads may exhibit consistent access times irrespective of the data location due to the fundamental nature of flash media. The reads are extremely flash media friendly and are considered "zero cost." To speed up the writes, storage array developers and manufacturers may take advantage of the locality of reference in application I/O traffic and may employ various caching/prefetching and background garbage collection techniques. Despite these optimizations, NVMe write completion time is relatively longer and variable compared to the reads. In one example, both reads and writes may use the same NVMe/TCP connection established between a given host 104 and NVMe storage controller 106. In other words, both reads and writes may be multiplexed on the same NVMe/TCP connection.

The application I/O profiles may be bursty. Bursty or burst data transmissions may include the transmission of a relatively high-bandwidth transmission over a short period. Burst transmissions may be intentional, broadcasting a compressed message at a very high data signaling rate within a very short transmission time. Most applications executed on a computing system generate I/Os at full rate and are designed to complete data transactions as soon as possible. However, the applications may not be aware whether the I/Os are serviced by local storage or remote storage via the fabric 102. The I/O transactions from an application are neither metered nor flow controlled. As a result, congestion is an unavoidable reality when NVMe I/Os are transported over any fabric transport including NVMe/TCP.

Congestion may occur either in the fabric 102 or inside the NVMe storage controller 106 and may be handled by two different flow control mechanisms at different layers of the NVMe/TCP stack. In one example, storage controller congestion may be handled at the NVMe layer of the NVMe/TCP stack with submission queue (SQ)/completion queue (CQ) flow control negotiated between the host 104 and the NVMe storage controller 106. An SQ may include a circular buffer with a fixed slot size that the host 104 uses to submit commands for execution by the NVMe storage controller 106. A CQ may be a circular buffer or queue with a fixed slot size or a fixed number of available entries that are used to post status for completed commands. A completed command may be uniquely identified by a combination of an associated SQ identifier and a command identifier that is assigned by host software. The SQ occupancy at the NVMe storage controller 106 may be constantly fed back to the host 104 as part of the response PDUs. The host 104 may post new requests to the SQ only when it is not full.

In one example, fabric congestion may be handled at the TCP layer of the NVMe/TCP stack. Detection of packet drop may be the most primitive form of indirect congestion identification with TCP. However, congestion notification techniques such as explicit congestion notification (ECN) may be utilized in data centers. ECN is an extension to the Internet protocol (IP) and to TCP and is defined in RFC 3168 (2001). ECN allows end-to-end notification of network congestion without dropping packets. ECN is an optional feature that may be used between two ECN-enabled endpoints when the underlying network infrastructure also supports it. Previously, TCP/IP networks signal congestion by dropping packets. When ECN is successfully negotiated, an ECN-aware router may set a mark in the IP header instead of dropping a packet in order to signal impending congestion. The receiver of the packet echoes the congestion indication to the sender, which reduces its transmission rate as if it detected a dropped packet. ECN marking in TCP/IP headers is negotiated between the host 104 and storage controller ends of the NVMe/TCP connection.

Active queue management (AQM) such as, for example, weighted random early detection (WRED) in data center (DC) switches such as, for example, the Nexus 9000 series switches developed and distributed by Cisco Systems, Inc. may detect congestion and change the ECN bits of the IP header to congestion encountered (CE) to indicate to the receiving endpoint of the impending congestion. In routers and switches, AQM is the policy of dropping packets inside a buffer associated with a network interface controller (NIC) before that buffer becomes full, often with the goal of reducing network congestion or improving end-to-end latency. This task is performed by the network scheduler, which for this purpose uses various algorithms such as random early detection (RED), WRED, ECN, or controlled delay (CoDel), among others. RFC 7567 recommends active queue management as a best practice.

The receiving end point may copy the CE information into an ECN bits such as an ECN Echo (ECE) bits of a TCP header. The receiving end point may reflect the TCP header including the ECN bits back to the transmitting TCP end point to act on the congestion. The transmitting end point is then expected to take action by reducing the TCP window size which reduces the packet transmission rate on that TCP connection. This, in turn may alleviate fabric congestion. The sender also sets a congestion window reduced (CWR) bit in the TCP header. In the case of a DC-TCP implementations, even the extent of congestion is encoded in the ECN marking and is used by end points to adjust the TCP window sizes. There is limited I/O flow control capabilities at the operating system (OS) and/or hypervisor layers and flow control due to congestion may be handled at the NVMe/TCP and NVMe layers as described above. However, both types of flow control actions are on the single TCP connection and impacts both read and write commands sharing the connection/SQ. First, this may cause storage controller head-of-line (HoL) blocking since writes can occupy a SQ entry for longer times compared to reads. Second, this may cause fabric HoL blocking between large writes and short reads and vice versa. HoL blocking in computer networking is a performance-limiting phenomenon that occurs when a line of packets is held up in a queue by a first packet. Examples include input buffered network switches, out-of-order delivery, and multiple requests in HTTP. Even though features like dynamic flow prioritization (DFP) on Nexus 9000 series switches is intended to alleviate this condition, it may not work well when the reads/writes are relatively small in one direction and relatively large in the opposite direction (analogous to flows looking like a mice flow in one direction and an elephant flow in the opposite direction).

Third, the impact on both read and write commands sharing the connection/SQ may cause inefficient congestion mitigation since ECN detected congestion will flow control an entire TCP connection and impact both reads and writes. For example, if the TCP window size reduction flow controls host Tx due to congestion, the write PDU 202 and H2C Data PDU 206, 208, 212, 214 will slow down the writes. However, the read PDU 108 will also slow down. Further, if TCP window size reduction flow controls storage controller Tx due to congestion, the C2H Data PDU 110, 112, 114, 116 will slow down the reads, but the R2T PDU 204, 210 will slow down the writes.

Figure 3:
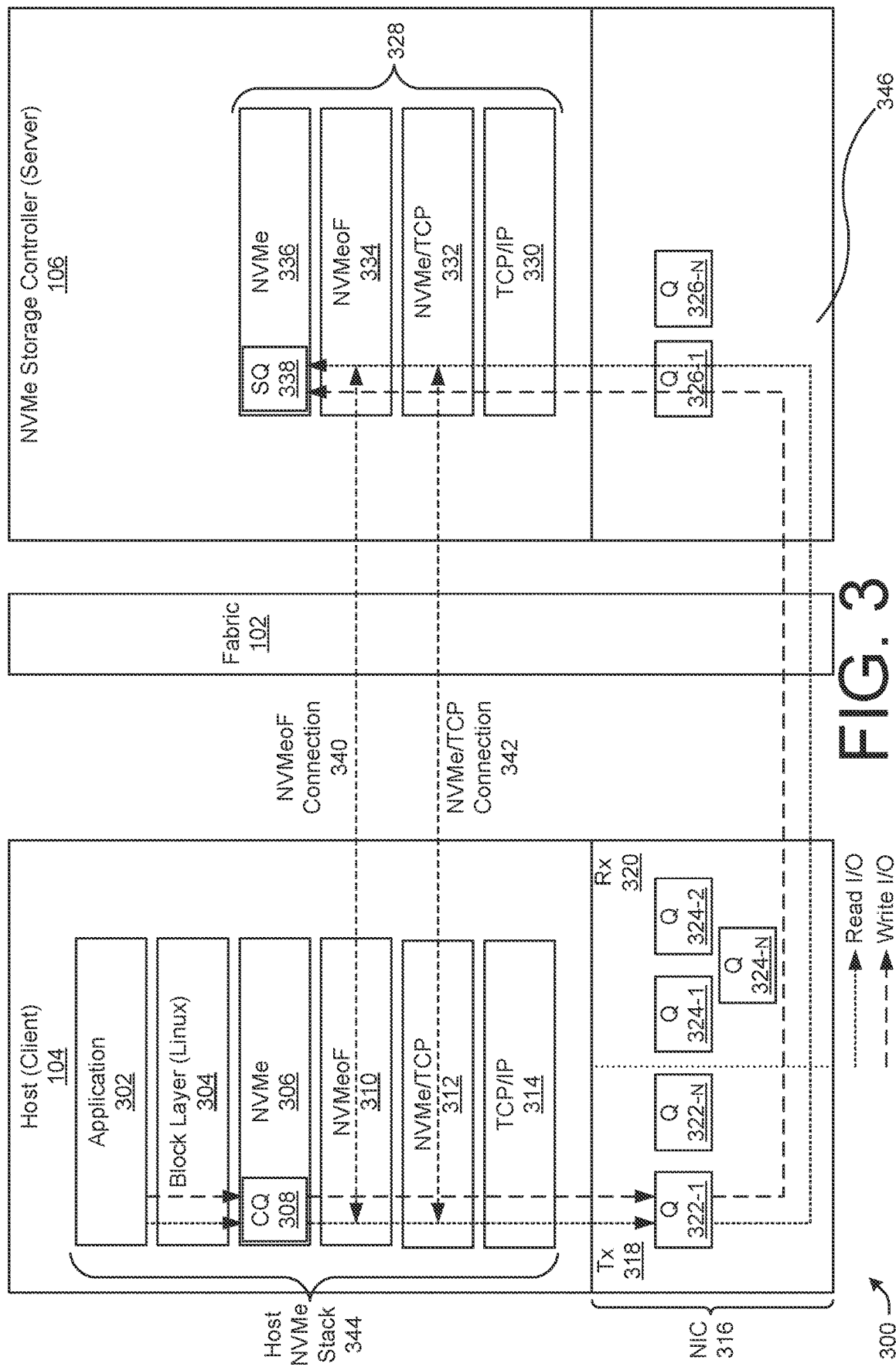
FIG. 3 illustrates a system-architecture diagram of an Non-volatile memory express (NVMe)/transmission control protocol (TCP) storage area network (SAN), according to an example of the principles described herein.

A storage customized congestion mitigation scheme that can extract maximum I/O performance from an NVMe/TCP SAN would reduce or eliminate the above shortcomings. Further, such a storage customized congestion mitigation scheme should achieve this end with minimal changes to the NVMe or TCP layers. FIG. 3 illustrates a system-architecture diagram of an NVMe/TCP SAN 300, according to an example of the principles described herein. The NVMe/TCP SAN 300 may include a host 104 acting as a client device such as a UCS developed and distributed by Cisco Systems, Inc. In one example, the host 104 may include a UCS host. The UCS may include any data center server computer product composed of server hardware, virtualization support, switching fabric, and management software capable of scalability by integrating many components of a data center that can be managed as a single unit. A UCS may include any converged data center architecture that integrates computing, networking, and storage resources to increase efficiency and enable centralized management. The NVMe/TCP SAN 300 may also include the fabric 102 and an NVMe storage controller 106 acting as a server computer.

The host 104 may include a host NVMe stack 344 including an application layer 302, a block layer 304 (e.g., a portion of the LINUX kernel which implements the interface that applications and filesystems use to access various storage devices), an NVMe layer 306, an NVMeoF layer 310, an NVMe/TCP layer 312, and a TCP/IP layer 314. A CQ is included at the NVMe layer 306. The CQ 308 may be mapped to a number of the Tx queues 322 located in a Tx portion 318 of the NIC 316 and/or a number of the Rx queues 324 located in an Rx portion 320 of the NIC 316.

The host 104 may further include a network interface card (NIC) 316. The NIC 316 may include any network adapter (e.g., a network interface card (NIC)) capable of transmitting data from the host 104 to the NVMe storage controller 106. In one example, the NIC 316 may include a virtual interface card, a virtual NIC (VNIC), or other network interface card. The NIC 316 may include a Tx portion 318 and an Rx portion 320. Each of the Tx portion 318 and an Rx portion 320 may include a number of queues. For example, the Tx portion 318 may include a number of Tx queues 322-1, . . . 322-N, where N is any integer greater than or equal to 1 (collectively referred to herein as Tx queue(s) 322 unless specifically addressed otherwise). Further, the Rx portion 320 may include a number of Rx queues 324-1, 324-2, . . . 324-N, where N is any integer greater than or equal to 1 (collectively referred to herein as Rx queue(s) 324 unless specifically addressed otherwise).

The NVMe storage controller 106 may include a controller network stack 328 including an NVMe layer 336, an NVMeoF layer 334, an NVMe/TCP layer 332, and a TCP/IP layer 330. An SQ 338 is included at the NVMe layer 336. The SQ 338 may be mapped to a number of the storage adapter queues 326. In the examples described herein, for every layer in the host NVMe stack 344 or the controller network stack 328 that includes a queue, that queue may be mapped to a queue in a lower layer such as the NIC 316 and the storage adapter 346, respectively.

The NVMe storage controller 106 may further include a storage adapter 346. The storage adapter 346 may include any hardware, software, or combinations thereof that connects the host 104 which acts as the host system, to the NVMe storage controller 106. The storage adapter 346 may include a number of storage adapter queues 326-1, . . . 326-N, where N is any integer greater than or equal to 1 (collectively referred to herein as storage adapter queue(s) 326 unless specifically addressed otherwise).

The NVMe layer 306 of the storage stack defines a SQ/CQ queue-pair that are one-to-one mapped to a 5-tuple TCP connection in NVMe/TCP. The NVMe I/O operations between the host 104 and its CQ 308 and the NVMe storage controller 106 and its SQ 338 make use of this TCP connection and the NVMe/TCP layer 312 of the host 104 manages this mapping via a dedicated NVMe/TCP connection 342. NVMe administrator commands use a separate administrator SQ/CQ at the NVMe layer 306 and use a different TCP connection independent of the I/O SQ/CQs, but are not relevant in the context of FIG. 3. All references are with respect to the I/O SQ/CQ. Further, an NVMeoF connection 340 is also included between the NVMe layer 306 of the host 104 and the NVMe layer 334 of the NVMe storage controller 106 in order to maintain connection with counterpart NVMe layers.

The read and write operations are the only mandatory commands defined in the NVMe 2.0 command set, and form a majority of the NVMe transactions between the host 104 and the NVMe storage controller 106. The other optional commands defined by the NVMe command set such as, for example, Compare, WriteZeros, etc., constitute not more than 1-2% of the overall traffic and can be classified along with the read/write command depending on how behaviorally close they are to read/write. All references may only be to read and write commands.

With reference to FIGS. 1 through 3, the Tx queues 322, Rx queues 324, and/or storage adapter queues 326 may include a number of entries that may be queued. As an example, the Tx queues 322, Rx queues 324, and/or storage adapter queues 326 may include ten entries for data packets. It may be determined whether more read or write commands may be sent from the host 104 to the NVMe storage controller 106 based on the number of free entries within the Tx queues 322, Rx queues 324, and/or storage adapter queues 326.

In one example of transmitting a read CC PDU to the NVMe storage controller 106 at 108 of FIG. 1, the host 104 may know how many packets may be sent to the NVMe storage controller 106 based on data transmitted at response capsule PDU at 120 that defines a number of free entries in the Tx queues 322, Rx queues 324, and/or storage adapter queues 326. For example, the host 104 may send an initial read CC PDU at 108, and the NVMe storage controller 106 may respond with a response capsule PDU at 120 indicating that there now are nine remaining entries in the SQ 338, Tx queues 322, Rx queues 324, and/or storage adapter queues 326 to accommodate for nine additional commands since the initial read CC PDU sent at 108 has occupied one entry in the Tx queues 322, Rx queues 324, and/or storage adapter queues 326. In one example, NVMe layer flow control may be performed in relation to the SQ and not on other lower layer queues. Similarly, if a second or subsequent read CC PDU at 108 is sent to the NVMe storage controller 106 at 108, the NVMe storage controller 106 may respond with a second or subsequent response capsule PDU at 120 indicating that there now are eight remaining entries in the SQ 338, Tx queues 322, Rx queues 324, and/or storage adapter queues 326 to accommodate for eight additional commands. If the initial and subsequent commands are processed, the queue occupancy may return to ten, and the NVMe storage controller 106 may respond with a response capsule PDU at 120 indicating that there now are ten remaining entries in the SQ 338, Tx queues 322, Rx queues 324, and/or storage adapter queues 326 to accommodate for ten additional commands. In this manner, the queue occupancy may always be known to the host 104 to allow the host 104 to determine whether additional commands may be sent. Further, in a similar manner, the host 104 may know the queue occupancy of the Tx queues 322, Rx queues 324, and/or storage adapter queues 326 as related to write commands sent at 202 and a queue occupancy value sent via the response capsule PDU sent at 216. In the above examples, the flow control may be associated with the SQ 338.

In the examples of FIGS. 1 through 3, the read and write commands are sent via the same queues (e.g., the Tx queues 322 and/or the storage adapter queues 326), and utilize a single SQ/CQ pair and a single TCP connection between a host 104 and the NVMe storage controller 106 as indicated with the CQ 308 and SQ 338 in FIG. 3. Both the read and write I/Os are multiplexed into the same connection. However, the read and write characteristics are drastically different due to the manner in which packets are transmitted in read and write commands. The read commands and write commands may block each other resulting in poor overall I/O throughput at times of congestion within the fabric 102. By using separate SQ/CQ pairs, separate TCP connections, and network interface card (NIC) (e.g., virtual interface card (VIC)) queues including work queues (WQs), virtual queues (VQs), and/or output queues (OQs) for read and write commands, the read commands and write commands are ensured to not interfere with each other during unidirectional fabric congestion resulting in optimal usage of the fabric 102.

Overview

Thus, in the examples described herein, systems, methods, and non-transitory computer-readable medium provide for a storage customized congestion mitigation scheme that extracts maximum I/O performance from a NVMe/TCP SAN. The present examples achieve this with minimal changes to the NVMe or TCP layers. By using separate SQs or CQs as separate TCP connections, and NIC (e.g., VIC) queues (e.g., the WQs, VQs, OQs) for read and write processes, the systems, methods, and non-transitory computer-readable medium ensures that the read and write processes do not interfere with each other during unidirectional fabric congestion. This results in an optimal fabric usage.

Examples described herein provide a method of congestion mitigation. The method may include determining whether a host is sending a read command or a write command to a controller, and in response to a determination that the host is sending the read command, transmitting the read command via a first transmission control protocol (TCP) connection between the host and the controller. The method may further include in response to a determination that the host is sending the write command, transmitting the write command via a second TCP connection between the host and the controller.

The method may further include receiving an internet protocol (IP) header at the host in response to the write command, determining if an IP header includes a congestion encountered (CE) bit within an explicit congestion notification (ECN) where the CE bit indicates congestion in a transmit (Tx) direction from the host, and throttling write inputs/outputs (I/Os) over the second TCP connection.

The method may further include, at a TCP layer of a network stack of the host, contracting a wrote TCP connection window size, and continuing to send additional read commands at a first pre-instructed rate. The method may further include determining if the congestion in a Tx direction from the host has subsided, and in response to a determination that the congestion in the Tx direction from the host has subsided, restoring the TCP connection window size to a pre-contracted state, processing additional write commands at a second pre-instructed rate, or combinations thereof.

The method may further include receiving an IP header at the host in response to the read command, determining if the IP header includes a CE bit within an ECN, the CE bit indicating congestion in a receive (Rx) direction towards the host, and throttling read I/Os over the first TCP connection. The method may further include at a TCP layer of a network stack of the host, sending instructions to the controller to contract a read RCP connection window size, and continuing to send additional write commands at a first pre-instructed rate. The method may further include determining if the congestion in the Rx direction toward the host has subsided, and in response to a determination that the congestion in the Rx direction toward the host has subsided, restoring the read TCP connection window size to a pre-contracted state, processing additional read commands at a second pre-instructed rate, or combinations thereof.

Examples described herein also provide a non-transitory computer-readable medium storing instructions that, when executed, causes a processor to perform operations. The operations may include determining whether a host is sending a read command or a write command to a controller, in response to a determination that the host is sending the read command, transmitting the read command via a first transmission control protocol (TCP) connection between the host and the controller, in response to a determination that the host is sending the write command, transmitting the write command via a second TCP connection between the host and the controller.

The operations may further include receiving an internet protocol (IP) header at the host in response to the write command, determining if an IP header includes a congestion encountered (CE) bit within an explicit congestion notification (ECN) where the CE bit indicates congestion in a transmit (Tx) direction from the host, and throttling write inputs/outputs (I/Os) over the second TCP connection. The operations may further include at a TCP layer of a network stack of the host, contracting a write TCP connection window size, and continuing to send additional read commands at a first pre-instructed rate. The operations may further include determining if the congestion in the Tx direction from the host has subsided, and in response to a determination that the congestion in the Tx direction from the host has subsided, restoring the write TCP connection window size to a pre-contracted state, processing additional write commands at a second pre-instructed rate, or combinations thereof.

The operations may further include receiving an IP header at the host in response to the read command, determining if the IP header includes a CE bit within an ECN where the CE bit indicating congestion in a receive (Rx) direction towards the host, and throttling read I/Os over the first TCP connection. The operations may further include at a TCP layer of a network stack of the host, sending instructions to the controller to contract a read TCP connection window size, and continuing to send additional write commands at a first pre-instructed rate. The operations may further include determining if the congestion in the Rx direction toward the host has subsided, and in response to a determination that the congestion in the Rx direction toward the host has subsided, restoring the read TCP connection window size o to a pre-contracted state, processing additional read commands at a second pre-instructed rate, or combinations thereof.

Examples described herein also provide a system including a processor, and a non-transitory computer-readable media storing instructions that, when executed by the processor, causes the processor to perform operations. The operations may include determining whether a host is sending a read command or a write command to a controller, in response to a determination that the host is sending the read command, transmitting the read command via a first transmission control protocol (TCP) connection between the host and the controller, and in response to a determination that the host is sending the write command, transmitting the write command via a second TCP connection between the host and the controller. The operations may further include receiving a first internet protocol (IP) header at the host in response to the write command, determining if the first IP header includes a first congestion encountered (CE) bit within a first explicit congestion notification (ECN) where the first CE bit indicating congestion in a transmit (Tx) direction from the host, and throttling write inputs/outputs (I/Os) over the second TCP connection. The operations may further include receiving a second IP header at the host in response to the read command, determining if the second IP header includes a second CE bit within a second ECN, the second CE bit indicating congestion in a receive (Rx) direction towards the host, and throttling read I/Os over the first TCP connection.

The operations may further include at a TCP layer of a network stack of the host, contracting a write TCP connection window size, continuing to send additional read commands at a first pre-instructed rate, determining if the congestion in the Tx direction from the host has subsided, and in response to a determination that the congestion in the Tx direction from the host has subsided, restoring the write TCP connection window size to a pre-contracted state, processing additional write commands at a second pre-instructed rate, or combinations thereof.

The operations may further include at a TCP layer of a network stack of the host, sending instructions to the controller to contract a read TCP connection window size, continuing to send additional write commands at a first pre-instructed rate, determining if the congestion in the Rx direction toward the host has subsided, and in response to a determination that the congestion in the Rx direction toward the host has subsided, restoring the read TCP connection window size to a pre-contracted state, processing additional read commands at a second pre-instructed rate, or combinations thereof.

The read command and the write command may be transmitted from the host to the controller via a fabric. The system may further include a plurality of write queues. The plurality of write queues partitioning the write command from a number of additional write commands. The system may further include a plurality of read queues. The plurality of read queues partitioning the read command from a number of additional read commands. The operations may further include, at a block layer of a network stack, enqueuing the read command and the write command into separate QMaps.

Additionally, the techniques described in this disclosure may be performed as a method and/or by a system having non-transitory computer-readable media storing computer-executable instructions that, when executed by one or more processors, performs the techniques described above.

Example Embodiments

Figure 4:
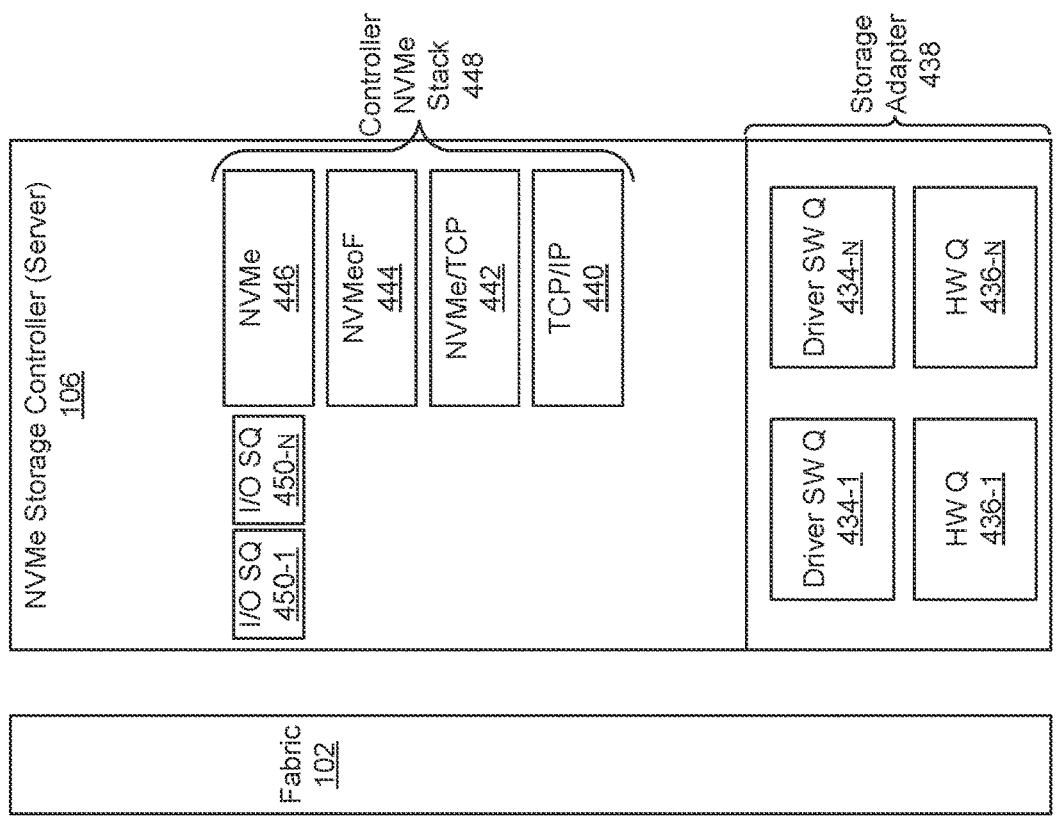
FIG. 4 illustrates a system-architecture diagram of an NVMe/TCP SAN, according to an example of the principles described herein.
Figure 4:
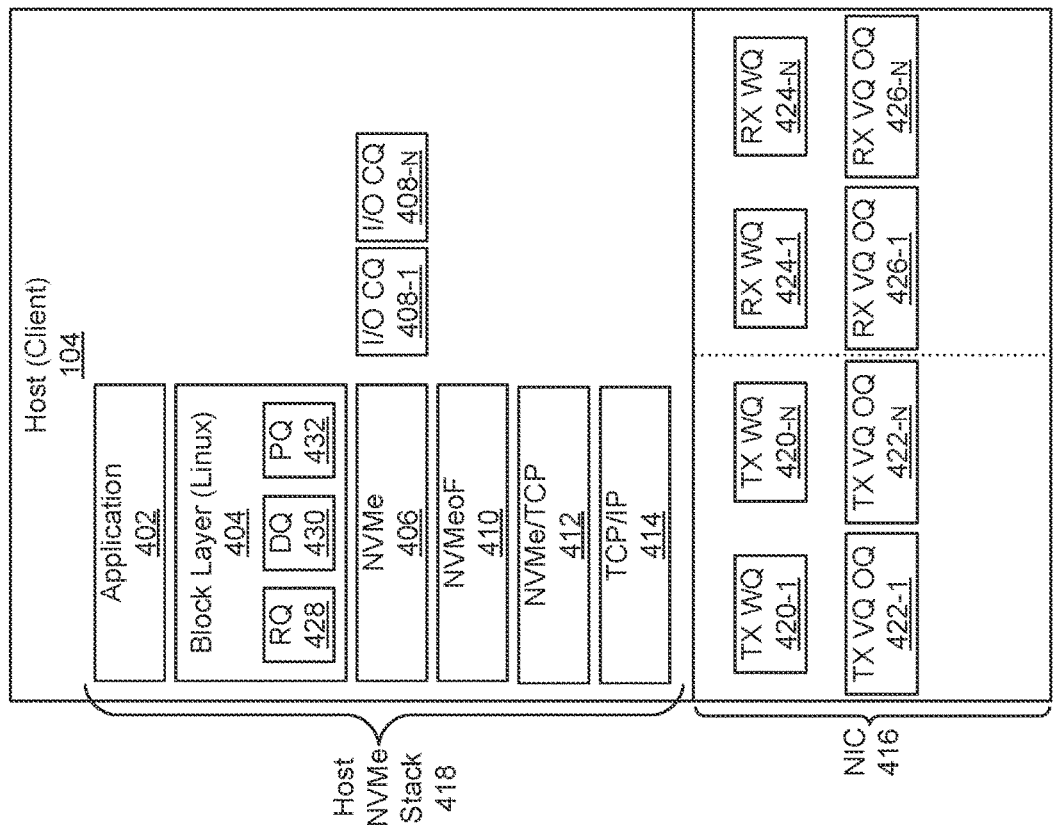

Turning again to the figures, FIG. 4 illustrates a system-architecture diagram of an NVMe/TCP SAN 400, according to an example of the principles described herein. The host 104 in the example of FIG. 4 may include a host NVMe stack 418 including an application layer 402, a block layer 404, an NVMe layer 406, an NVMeoF layer 410, an NVMe/TCP layer 412, and a TCP/IP layer 414. Unlike the example of FIG. 3, the block layer 404 of FIG. 4 may include a read queue (RQ) 428 separate from a default queue (DQ) 430. The default queue 430 may act as the write queue. Further, the block layer 404 may include a high priority I/O queue (PQ) 432. The PQ 432 of the block layer 404 is defined for high priority I/Os and may be mapped to its own dedicated queue and TCP/IP connection. FIG. 4 depicts a number of queues that are part of the host 104 and the NVMe storage controller 106.

Figure 5:
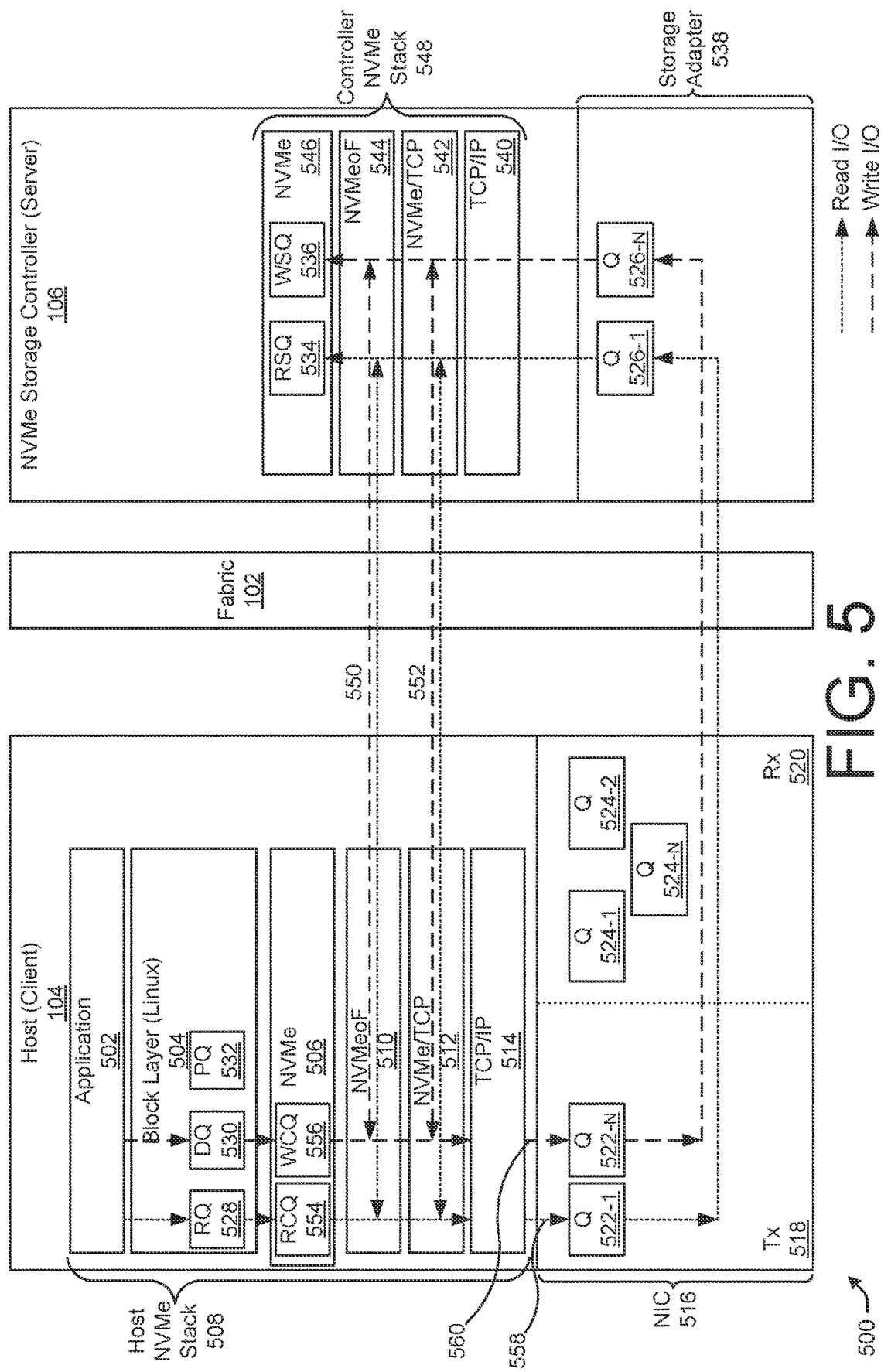
FIG. 5 illustrates a system-architecture diagram of an NVMe/TCP SAN depicting read and write separation, according to an example of the principles described herein.
Figure 6:
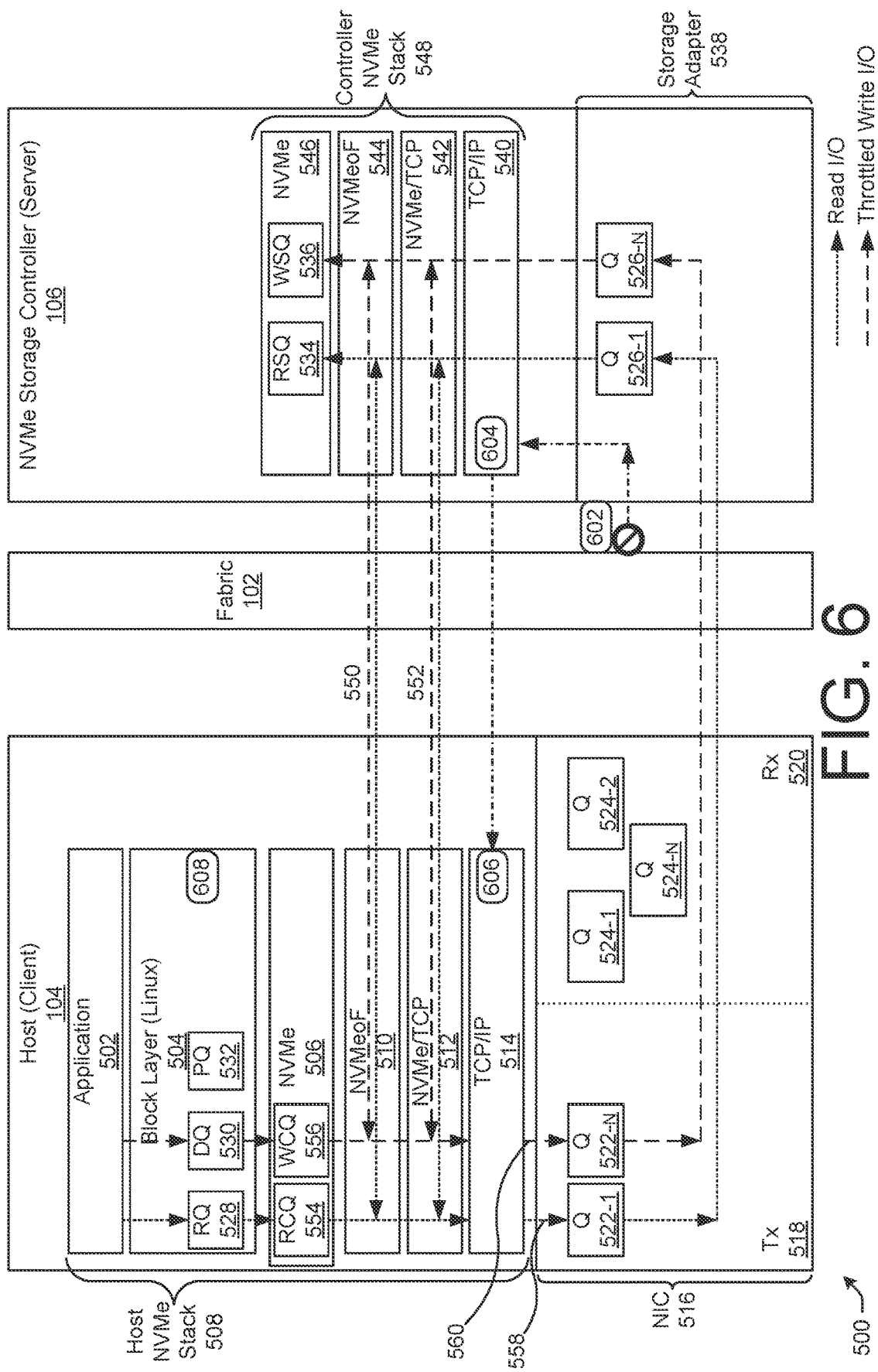
FIG. 6 illustrates a system-architecture diagram of an NVMe/TCP SAN of FIG. 5 depicting congestion in the fabric away from the host, according to an example of the principles described herein.
Figure 7:
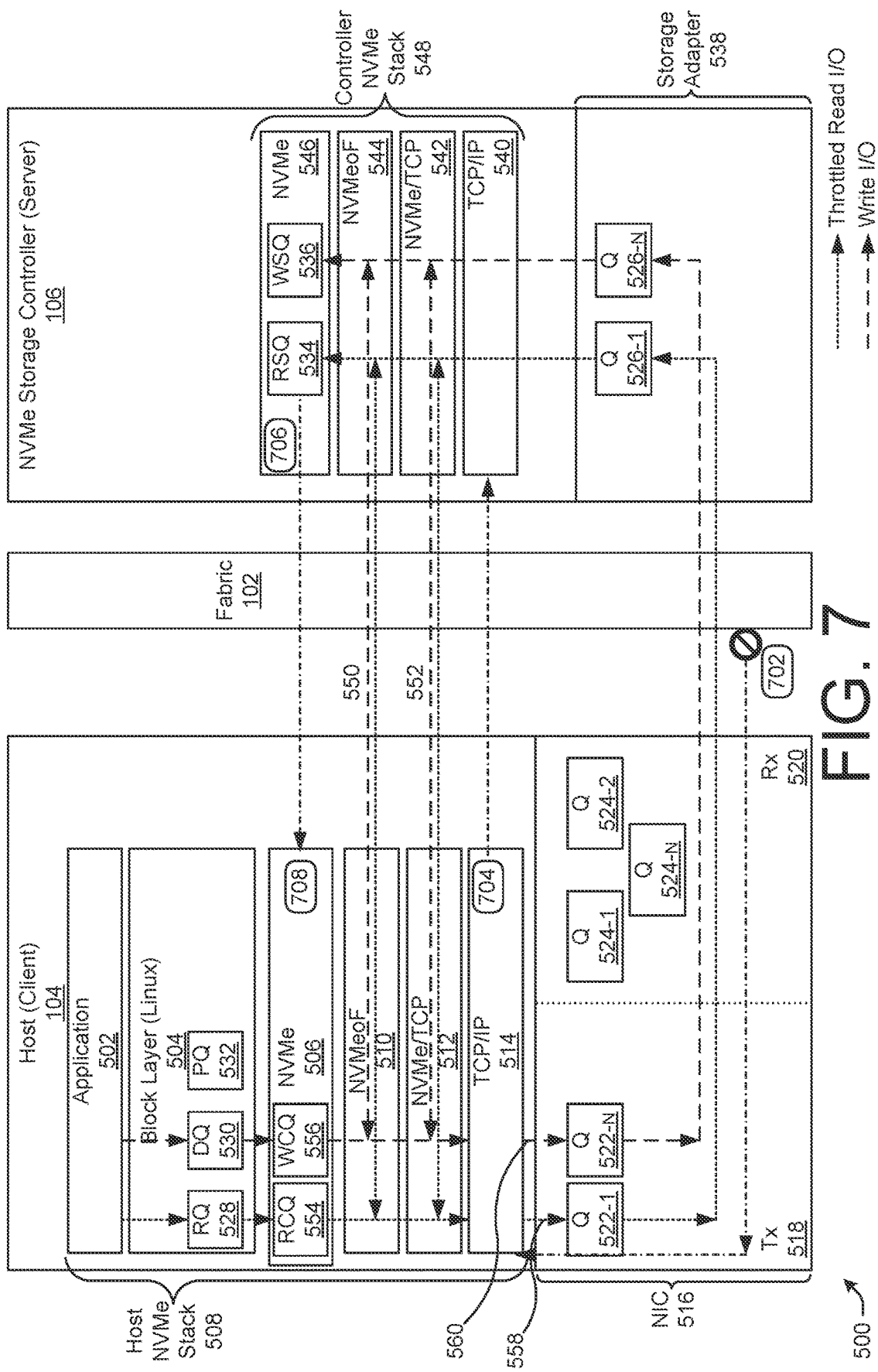
FIG. 7 illustrates a system-architecture diagram of an NVMe/TCP SAN of FIG. 5 depicting congestion in the fabric towards the host, according to an example of the principles described herein.

The NVMe layer 406 may include a separate read completion queue (RCQ) and write completion queue (WCQ) as depicted in FIGS. 5 through 7 and described in more detail herein. The NVMe layer 406 may assist in managing the queues within the NVMe/TCP SAN 400. Further, at the NVMe layer 406 may be associated with a number of I/O CQs 408-1, . . . 408-N, where N is any integer greater than or equal to 1 (collectively referred to herein as I/O CQ(s) 408 unless specifically addressed otherwise). The I/O CQs 408 pair with a number of I/O SQs 450-1, . . . 450-N, where N is any integer greater than or equal to 1 (collectively referred to herein as I/O SQ(s) 450 unless specifically addressed otherwise). The I/O SQs 450 may be associated with an NVMe layer 446 of a controller NVMe stack 448 of the NVMe storage controller 106. Thus, separation of the SQ/CQ pairs at the NVMe layer 406 and NVMe layer 446, respectively, for read commands and write commands supports the ability to provide separate communication channels so that the read commands and the write commands are ensured to not interfere with each other during unidirectional fabric congestion resulting in optimal usage of the fabric 102.

The NVMe storage controller 106 may include a controller NVMe stack 448. The controller NVMe stack 448 may include an NVMe layer 446, an NVMeoF layer 444, an NVMe/TCP layer 442, and a TCP/IP layer 440. The storage adapter 438 may include a number of driver software (SW) queues (Driver SW Qs) 434-1, 434-N, where N is any integer greater than or equal to 1 (collectively referred to herein as driver SW Q(s) 434 unless specifically addressed otherwise) and a number of hardware (HW) queues (HW Qs) 436-1, . . . 436-N, where N is any integer greater than or equal to 1 (collectively referred to herein as driver HW Q(s) 436 unless specifically addressed otherwise). In one example, the SW Qs 434 and HW Qs 436 may include vendor-specific queue architecture within the storage adapter 438.

As part of the examples of the NVMe/TCP SAN described herein, in order to avoid HoL blocking with mixed workloads on the block layer 404 of the host 104, read commands and write commands are enqueued into separate QMaps at the block layer 404. Although QMaps are described herein in connection with a number of examples, the present systems, methods, and non-transitory computer-readable medium may be applied in connection with NVMe/TCP, remote direct memory access (RDMA) over converged ethernet (RoCE) (NVMe/RoCE), and NVMe over fibre channel (FC) (NVMe/FC) transports as well.

This allows application read commands and write commands to be steered through separate queues. The present systems, methods, and non-transitory computer-readable medium extending this technique by creating the two separate SQ/CQ pairs (e.g., CQs 408 and SQ(s) 450) at the NVMe layer 406 and NVMe layer 446, respectively, for read/write and map the SQ/CQ pairs to separate TCP connections at the TCP/IP layer 414 and TCP/IP layer 440, respectively. Further, the SQ/CQ pairs are one-to-one mapped to the RQ 428 and DQ 430 at the block layer 404. In an example where an operating system (OS) does not perform Linux style partitioning at the block layer 404, the read or write demultiplexing (demux) may be performed starting at the NVMe layer 406 using the 'SQE.Opcode' field in the submission queue entry (SQE) of the PDU to enqueue either to the read or write SQ. The NVMe layer 446 may include a separate read submission queue (RSQ) and write submission queue (WSQ) as depicted in FIGS. 5 through 7 and described in more detail herein.

In one example, an application specific integrated circuit (ASIC) for the NIC 416 (e.g., a UCS host adapter) that is designed for connecting to an NVMe/TCP SAN 400 may be included. This ASIC may support NVMe/TCP offload and may include a multilevel queueing architecture. The multilevel queueing architecture of the NIC 416 may include a number of Tx WQs 420-1 420-N, where N is any integer greater than or equal to 1 (collectively referred to herein as Tx WQ(s) 420 unless specifically addressed otherwise), a number of Tx VQ/OQs 422-1, . . . 422-N, where N is any integer greater than or equal to 1 (collectively referred to herein as Tx VQ/OQ(s) 422 unless specifically addressed otherwise), a number of Rx WQs 424-1 424-N, where N is any integer greater than or equal to 1 (collectively referred to herein as Rx WQ(s) 424 unless specifically addressed otherwise), and a number of Rx VQ/OQs 426-1, . . . 426-N, where N is any integer greater than or equal to 1 (collectively referred to herein as Tx VQ/OQ(s) 426 unless specifically addressed otherwise). The Tx WQs 420 and/or Rx WQs 424 may include 16K WQs in the Tx direction mapped to the Tx VQ/OQs 422 as depicted in FIG. 4. In one example, the NVMe/TCP connections at the NVMe/TCP layer 412 may be mapped to a Tx WQs 420 before handing the connections over to the Tx VQ/OQs 422 in the Tx direction. Further, in one example, the Tx VQ/OQs 422 may also be partitioned for read and write with the read Tx VQ/OQs 422 multiplexing TCP read connections and write Tx VQ/OQs 422 doing the same for writes. Due to a limited number of Tx VQ/OQs 422, a read Tx VQ/OQ 422 may be muxing reads of different NVMe/TCP RSQs and a write Tx VQ/OQ 422 may be muxing writes of different NVMe/TCP WSQs. In this manner, it may be ensured that there is no point in the host 104 where read commands and write commands may merge or block each other from the block layer 404 to the NIC 416.

Further, in one example, NVMe may allow for up to 64K SQ/CQ pairs between the host 104 and the NVMe storage controller 106. In one example, the NVMe may allow for up to a few hundred SQ/CQ pairs. Therefore, using separate read/write SQ/CQ pairs will not be difficult to achieve. Although the examples described herein depict the various queues in a UCS-based host system and the read/write flow across the host 104 and the NVMe storage controller 106, similar architecture may be utilized in non-UCS host systems as well. Having described the example of FIG. 4, an example including how communication between the host 104 and the NVMe storage controller 106 via the fabric 102 will be described below.

FIG. 5 illustrates a system-architecture diagram of an NVMe/TCP SAN 500 depicting read and write separation, according to an example of the principles described herein. As similarly described above in connection with FIG. 4, the host 104 may include a host NVMe stack 508 including an application layer 502, a block layer 504, an NVMe layer 506, an NVMeoF layer 510, an NVMe/TCP layer 512, and a TCP/IP layer 514. The block layer 504 of FIG. 5 may include an RQ 528 separate from a default queue (DQ) 530. Again, the default queue 530 may act as the write queue. Further, the block layer 504 may include a PQ 532. The PQ 532 of the block layer 504 is defined for high priority I/Os and may be mapped to its own dedicated queue and TCP/IP connection.

The NVMe layer 506 may include a separate read completion queue (RCQ) 554 and write completion queue (WCQ) 556. The RCQ 554 of the NVMe layer 506 may be mapped to the RQ 528 of the block layer 504. Likewise, the WCQ 556 of the NVMe layer 506 may be mapped to the DQ 530 of the block layer 504. The NVMe layer 506 may assist in managing the queues within the NVMe/TCP SAN 500. Further, the RCQ 554 of the NVMe layer 506 may be mapped to a first connection 558 provided at the TCP/IP layer. Similarly, the WCQ 556 of the NVMe layer 506 may be mapped to a second connection 560 provided at the TCP/IP layer.

The host 104 may also include the NIC 516. The first connection 558 and the second connection 560 may be queued within the NIC 516 at a number of Tx queues 522-1, . . . 522-N, where N is any integer greater than or equal to 1 (collectively referred to herein as Tx queue(s) 522 unless specifically addressed otherwise) located in a Tx portion 518 of the NIC 516. The read I/O may utilize a first Tx queue 522-1 and the write I/O may utilize a second Tx queue 522-N in order to maintain the separation of the read commands and the write commands via the first connection 558 and the second connection 560, respectively. The NIC 516 may further include a number of Rx queues 524-1, 524-2, . . . 524-N, where N is any integer greater than or equal to 1 (collectively referred to herein as Rx queue(s) 524 unless specifically addressed otherwise) located in a Rx portion 520 of the NIC 516.

The first connection 558 and the second connection 560 may be transmitted via the fabric 102 to the storage adapter 538 of the NVMe storage controller. The storage adapter 538 may include two or more storage adapter queues 526-1, . . . 526-N, where N is any integer greater than or equal to 1 (collectively referred to herein as storage adapter queue(s) 526 unless specifically addressed otherwise). The first connection 558 may be directed to a first storage adapter queue 526-1 and the second connection 560 may be directed to a second storage adapter queue 526-N.

The NVMe storage controller 106 may further include a controller NVMe stack 548. The controller NVMe stack 548 may include an NVMe layer 546, an NVMeoF layer 544, an NVMe/TCP layer 542, and a TCP/IP layer 540. The read command transmitted via the first connection 558 may be directed to an RSQ 534. The write command transmitted via the second connection 560 may be directed to a WSQ 536. In this manner, it may be ensured that there is no point in the host 104, the fabric 102, and the NVMe Storage Controller 106 where read commands and write commands may merge or block each other from the RQ 528 and RCQ 554 to the RSQ 534 and from the DQ 530 and WCQ 556 to the WSQ 536.

Thus, separation of the RCQ 554 and the WCQ 556 at the NVMe layer 506 and NVMe layer 546, respectively, for read commands and write commands supports the ability to provide separate communication channels so that the read commands and the write commands are ensured to not interfere with each other during unidirectional fabric congestion resulting in optimal usage of the fabric 102. Further, surging of queue occupancy within the Tx queues 522, Rx queues 524, and/or storage controller queues 526 occurs separately for the RSQ 534 and the WSQ 536.

An NVMeoF connection 550 is also included between the NVMeoF layer 510 of the host 104 and the NVMe layer 544 of the NVMe storage controller 106 in order to maintain connection with counterpart NVMe layers. Similarly, an NVMe/TCP connection 552 is included between the NVMe/TCP layer 512 of the host 104 and the NVMe/TCP layer 542 of the NVMe storage controller 106 in order to maintain connection with counterpart NVMe/TCP layers.

Having described the various elements of the NVMe/TCP SAN 500, FIG. 6 illustrates a system-architecture diagram of an NVMe/TCP SAN 500 of FIG. 5 depicting congestion in the fabric 102 away from the UCS host 10, according to an example of the principles described herein. With complete read/write separation in the UCS host 10, a number of ECN notifications including ECN marking in TCP/IP headers as negotiated between the host 104 and the storage controller ends of the NVMe/TCP connection 552 may be handled automatically in a storage aware manner. The storage aware manner may include, if an ECN marked TCP header is received on the NVMe/TCP connection 552, this indicates there is congestion in the Tx direction from the host 104 due to writes. At the TCP/IP layer 514, this ECN notification may cause contraction of the TCP window size and results in flow controlling the second connection 560. As a result, the write command and H2C Data PDU Tx are throttled as depicted in FIG. 6.

During the write command and H2C Data PDU Tx throttling, the read connection (e.g., the first connection 558) and the queues (e.g., the Tx queues 522-1) are not impacted and the host 104 may continue to send read commands at a full rate despite the throttled H2C data PDUs (see, FIG. 2, 206, 208, 212, 214). This ensures consistent application read performance even during times of recurring congestion in the Tx direction.

At some point, the congestion in the Tx direction may subside. When this occurs, the cleared ECN bits may cause the TCP window size to be restored to a pre-contracted state allowing the writes to be processed at full rate again. Further, restoring the TCP window size also removes any form of write I/O throttling that was in force during the congestion.

Thus, at 602 of FIG. 6, congestion within the fabric 102 in the Tx direction may occur. In this congested state, a device within the fabric 102 such as a switch or router may include an ECN marking in the TCP/IP header of the IP packets sent in connection with the H2C data PDUs 206, 208, 212, 214. The ECN marking may include a change in the ECN bits of the IP header to congestion encountered (CE) to indicate to the receiving endpoint of the impending congestion. At 604, the TCP header echoes back the ECN to the source (e.g., the host 104) in an R2T response PDU. This R2T response PDU may be sent from the TCP/IP layer 540 of the controller NVMe stack 548 to the TCP/IP layer 514 of the host NVMe stack 508. At 606, the host NVMe stack 508 reduces the TCP window size in order to slow down the writes to the WCQ 556. At 608, the host 104 may throttle the write I/Os from the DQ 530 until the ECN returns with ECN bits of the IP header indicating to the receiving endpoint that congestion no longer exists. Again, the read I/Os are not impacted, and the host 104 may continue to send read commands at a full rate.

FIG. 7 illustrates a system-architecture diagram of an NVMe/TCP SAN 500 of FIG. depicting congestion in the fabric 102 towards the host 104, according to an example of the principles described herein. Again, with complete read/write separation in the UCS host 10, a number of ECN notifications including ECN marking in TCP/IP headers as negotiated between the host 104 and the storage controller ends of the NVMe/TCP connection 552 may be handled automatically in a storage aware manner. The storage aware manner may include, if the ECN bit is marked in the IP header with the CE received by the host 104, congestion is present in the Rx direction towards the host 104 due to reads. In some situations, the host 104 may exhibit behaviors such that the host 104 may ask for too much data in reads than what the host 104 may practically consume. This may result in this form of congestion in the Rx direction towards the host 104. The host 104 may reflect the ECN bits to the NVMe storage controller 106 and a TCP window contraction at the controller end of the connection may slow down the C2H data PDUs 110, 112, 114, 116 of FIG. 1. This situation will eventually result in submission of the reads to the SQ (e.g., the RSQ 534) to stop from the host 104 due to entries within the read SQ (e.g., the RSQ 534) being full. This scenario and condition within the RSQ 534 may be analogous or similar to a storage controller busy scenario where SQ flow control is asserted. The situation where the entries in the RSQ 534 are full may eventually reduce fabric 102 congestion as well. Further, despite the congestion in the Rx direction towards the host 104 that may exist, write performance may be unimpeded even during these instances of recurring congestion in the Rx direction. During the read command and C2H data PDU Rx throttling, the write connection (e.g., the second connection 560) and the queues (e.g., the Tx queues 522-N) are not impacted and the host 104 may continue to send write commands at a full rate despite the throttled C2H data PDU s (see, FIG. 1, 110, 112, 114, 116). This ensures consistent application write performance even during times of recurring congestion in the Rx direction.

At some point, the congestion in the Rx direction may subside. When this occurs, the cleared ECN bits may cause the TCP window size to be restored to a pre-contracted state allowing the reads to be processed at full rate again. Thus, if fabric 102 congestion recovers in the Rx direction, the ECN bit is no longer set to CE and the connection may return back to normal operation allowing the host 104 to submit reads at full rate. Further, restoring the TCP window size also removes any form of read I/O throttling that was in force during the congestion.

Thus, at 702 of FIG. 7, congestion in the Rx direction within the fabric 102 may occur. In this congested state, a device within the fabric 102 such as a switch or router may include an ECN marking in the TCP/IP header of the IP packets sent in connection with the C2H data PDUs 110, 112, 114, 116. The ECN marking may include a change in the ECN bits of the IP header to CE to indicate to the host 104 of the impending congestion. At 704, the TCP header echoes back the ECN to the receiving device (e.g., the NVMe storage controller 106) in an R2T response PDU. This R2T response PDU may be sent from the TCP/IP layer 514 of the host NVMe stack 508 to the TCP/IP layer 540 of the controller NVMe stack 548. Also at 704, the controller NVMe stack 548 reduces the TCP window size in order to slow down the read responses to the RCQ 554. At 706, the completions may be posted to the RCQ 554, and the RCQ 554 may react by slowing down the read commands and flow controlling the read commands. At 708, the host 104 may throttle the read I/Os from the RQ 528 until the ECN returns with ECN bits of the IP header indicating that congestion in the Rx direction no longer exists. Again, the write I/Os are not impacted, and the host 104 may continue to send write commands at a full rate.

For both write and read throttling in the examples of FIGS. 6 and 7, respectively, when data center (DC) TCP (DCTCP) is enabled, the ECN marking may be used for finer tuning of the TCP window size on the NVMe/TCP connection. DCTCP is a TCP congestion control scheme for data-center traffic. DCTCP extends the ECN processing to estimate the fraction of bytes that encounter congestion rather than simply detecting that some congestion has occurred. DCTCP then scales the TCP congestion window based on this estimate. This method achieves high-burst tolerance, low latency, and high throughput with shallow-buffered switches.

It may be a concern that utilizing separate TCP connections may cause Read/Write sequencing of an application to change. However, the NVMe specifications do not require to maintain sequencing. Under the NVM Express Base Specification, Revision 2.0 updated Jul. 23, 2021 states, "[e]xcept for fused operations, there are no ordering restrictions for processing of commands within or across Submission Queues. Host software should not submit commands to a Submission Queue that may not be re-ordered arbitrarily." Thus, all that is required is to ensure that fused commands are always queued to the same queue.

HoL blocking may also occur within a write queue if there are large write I/Os ahead of smaller write I/Os. A large I/O may occupy the SQ for a relatively long period awaiting write completion. To address these situations, additional queues may be used for further partitioning writes based on the I/O size for finer congestion management. For example, a write I/O that is less than or equal to 8K in size (<8K) may be enqueued to a first SQ/TCPConnection/WQ and a write I/O that is greater than 8K (>8K) in size may be enqueued to a second SQ/TCPConnection/WQ. In some instances of Tx congestion, the >8K queues may be aggressively flow controlled or rate limited since the >8K queues solicit more C2H Data PDUs 110, 112, 114, 116 per write than a <8K WQ. To avoid running out of queues, the finer partitioning provided by the additional queues being used for further partitioning writes based on the I/O size may be supported for performance-critical Tier-1 applications only.

The NVM Express Base Specification, Revision 2.0 updated Jul. 23, 2021 does not require CQs on the host 104 to be flow controlled with NVMeoF interface specification. This is because the CQ receives completion messages that have already traversed the fabric 102 and do not solicit additional PDUs. Hence the Rx WQ 424 within the NIC 416, 516 is already one-to-one mapped to the CQ and does not require a read/write response separation.

The queue resources and ports of the host adapter such as, for example, the NIC 416, 516 may be expected to be divided roughly equally among local area network (LAN) and SAN traffic emanating from the host 104. In one example, among 16K Tx WQs 420, approximately 8K may be used for storage traffic emanating from the host 104. In this situation and with the examples described herein, this means 4K NVMe SQ/CQs with read/write separation may be provided. The 4K SQ/CQ pairs are deemed sufficient for most practical use-cases. NVMe/TCP offload allows complete SQ/CQ management in the NIC 416, 516. In offload mode of the NVMe/TCP, the RSQ/WSQ separation may be programmed in the ASIC for the NIC 416, 516 itself instead of a NVMe host driver of the host 104.

Further, the present systems, methods, and non-transitory computer-readable medium may be extended to other NVMe command sets such as, for example, the NVMe Zoned NameSpace (NVMe-ZNS) and NVMe Key Value (NVMe-KV). The read/write equivalents may include, for example, ZNSRead/ZNSWrite and KV-Retreive/KVStore, respectively.

Still further, while the present systems, methods, and non-transitory computer-readable medium may be described for NVMe/TCP traffic, the same may be extended to other storage encapsulations possible on the NIC 416, 516 such as, for example, NVMe over Remote Direct Memory Access (RDMA) over Converged Ethernet (NVMe-RoCE), version 2 and NVMe over Fibre Channel (NVMe-FC).

RoCEv2 uses UDP transport where native flow control mechanism is not available. In this example, the ECN markings in IP headers may be used to tune a number of rate limiters (RLs) supported by the ASIC for the NIC 416, 516 on Tx WQs 420 to achieve flow control on individual connections. Based on the ECN notification, the corresponding WQ transmission may be adaptively rate limited to alleviate congestion. The first instance of ECN causes the RLs to cut the transmission rate by 'n'. In an example where congestion is persistent, every 'm' instances of the ECN notification may result in further rate reduction by 'n' from the current rate. Further, when fabric congestion subsides and the host 104 is notified by ECN, the RL rate may be programmed to gradually increase transmission rate by 'k' until a point where no RL is performed. The rate 'n' may be greater than 'k' so that the congestion may be aggressively acted upon and conservatively restore to full rate.

In an example where NVMe-FC is utilized, the fabric congestion downstream in a Fibre Channel fabric (e.g., fabric 102) may be indicated by Fabric Performance Impact Notification (FPIN) notifications to the host 104. In the UCS host Tx direction the FPIN may include an FPIN-PeerCongestion notification and in the UCS host Rx direction the FPIN may include FPIN-Congestion notifications. The same WQs rate limiting mechanism as described above in connection with RoCEv2 may be utilized.

Figure 8:
FIG. 8 illustrates a flow diagram of an example method for congestion mitigation, according to an example of the principles described herein.

FIG. 8 illustrates a flow diagram of an example method 800 for congestion mitigation, according to an example of the principles described herein. The method 8 may include, at 802, determining whether the host 104 is sending a read command or a write command to the NVMe storage controller 106. At 804, in response to a determination that the host 104 is sending the read command, transmitting the read command via a first transmission control protocol (TCP) connection between the host 104 and the NVMe storage controller 106. Further, at 806, in response to a determination that the host 104 is sending the write command, transmitting the write command via a second TCP connection between the host 104 and the NVMe storage controller 106. In this manner, two separate TCP connections and respective queues are utilized to transmit read commands and write commands so that the read commands and the write commands do not interfere with each other during unidirectional fabric congestion resulting in optimal fabric usage.

Figure 9:
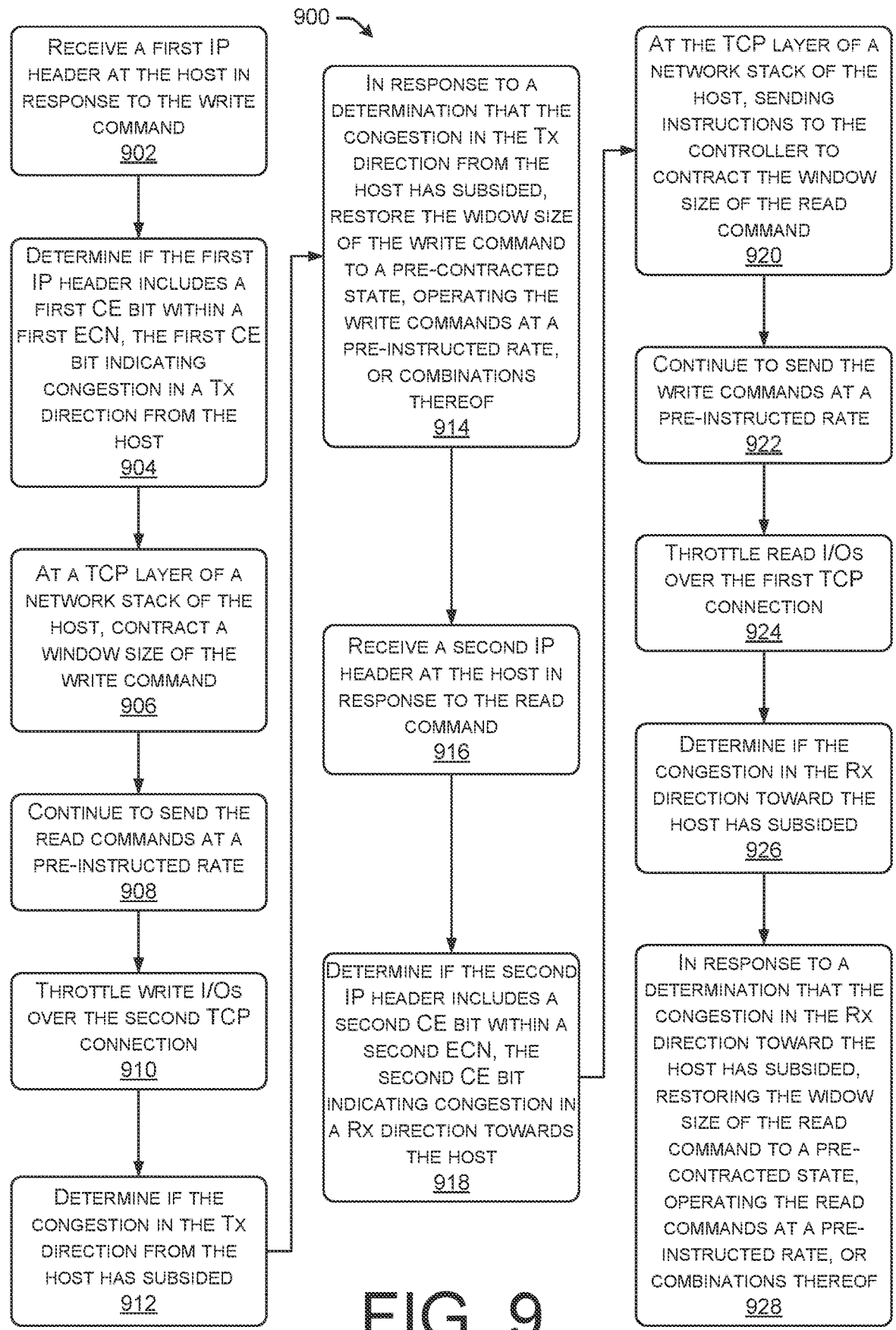
FIG. 9 illustrates a flow diagram of an example method for congestion mitigation, according to an example of the principles described herein.

FIG. 9 illustrates a flow diagram of an example method 900 for congestion mitigation, according to an example of the principles described herein. The method 900 may include, at 902, receiving a first IP header at the host 104 in response to a write command. At 904, the host 104 may determine if the first IP header includes a first CE bit within a first ECN. The first CE bit may be used to indicate congestion in a Tx direction from the host 104.

At a TCP layer of a network stack of the host (e.g., host NVMe stack 344, 418, 508), TCP window size of the TCP connection for the writes may be contracted at 906 based on the CE bit being present in the first ECN. At 908, the read commands may continue to be sent at a pre-instructed rate. Stated another way, the read commands are unaffected by the congestion occurring in the Tx direction from the host 104.

At 910, the write I/Os may be automatically throttled as a result of the contraction of the write TCP connection window size over the second connection 560 (e.g., a TCP connection). Throttling may include any process that reduces the rate of transmission of write commands in the Tx direction from the host 104. In this manner, the write commands may be throttled in order to reduce or eliminate the congestion in the Tx direction from the host 104.

At 912, it may be determined if the congestion in a Tx direction from the host 104 has subsided. In response to a determination that the congestion in the Tx direction from the host 104 has subsided, at 914, the TCP window size of the TCP connection for the writes may be restored to a pre-contracted state, additional write commands may be processed at a pre-instructed rate, or combinations thereof. Further, restoring the TCP window size also removes any form of write I/O throttling that was in force during the congestion.

A second IP header may be received at the host 104 at 916 in response to a read command. At 918, it may be determined if the IP header includes a CE bit within an ECN where the CE bit indicates congestion in a Rx direction towards the host 104. At 920, instructions may be sent to the NVMe storage controller 106 at the TCP/IP layer 314, 414, 514 of the host NVMe stack 418 of the host 104 to contract a TCP window size of the TCP connection for the reads. The host 104 may continue to send the write commands at a pre-instructed rate at 922. Stated another way, the write commands are unaffected by the congestion occurring in the Rx direction towards the host 104.

At 924, the read I/Os may be automatically throttled as a result of the contraction of the read TCP connection window size over the first connection 558 (e.g., a TCP connection). Throttling may include any process that reduces the rate of transmission of read commands in the Rx direction towards the host 104. In this manner, the read commands may be throttled in order to reduce or eliminate the congestion in the Rx direction towards the host 104.

At 926, it may be determined if the congestion in the Rx direction toward the host 104 has subsided. In response to a determination that the congestion in the Rx direction toward the host 104 has subsided, the TCP window size of the read TCP connection may be restored to a pre-contracted state, additional read commands may be processed at a pre-instructed rate, or combinations thereof. Further, restoring the TCP window size also removes any form of read I/O throttling that was in force during the congestion.

Figure 10:
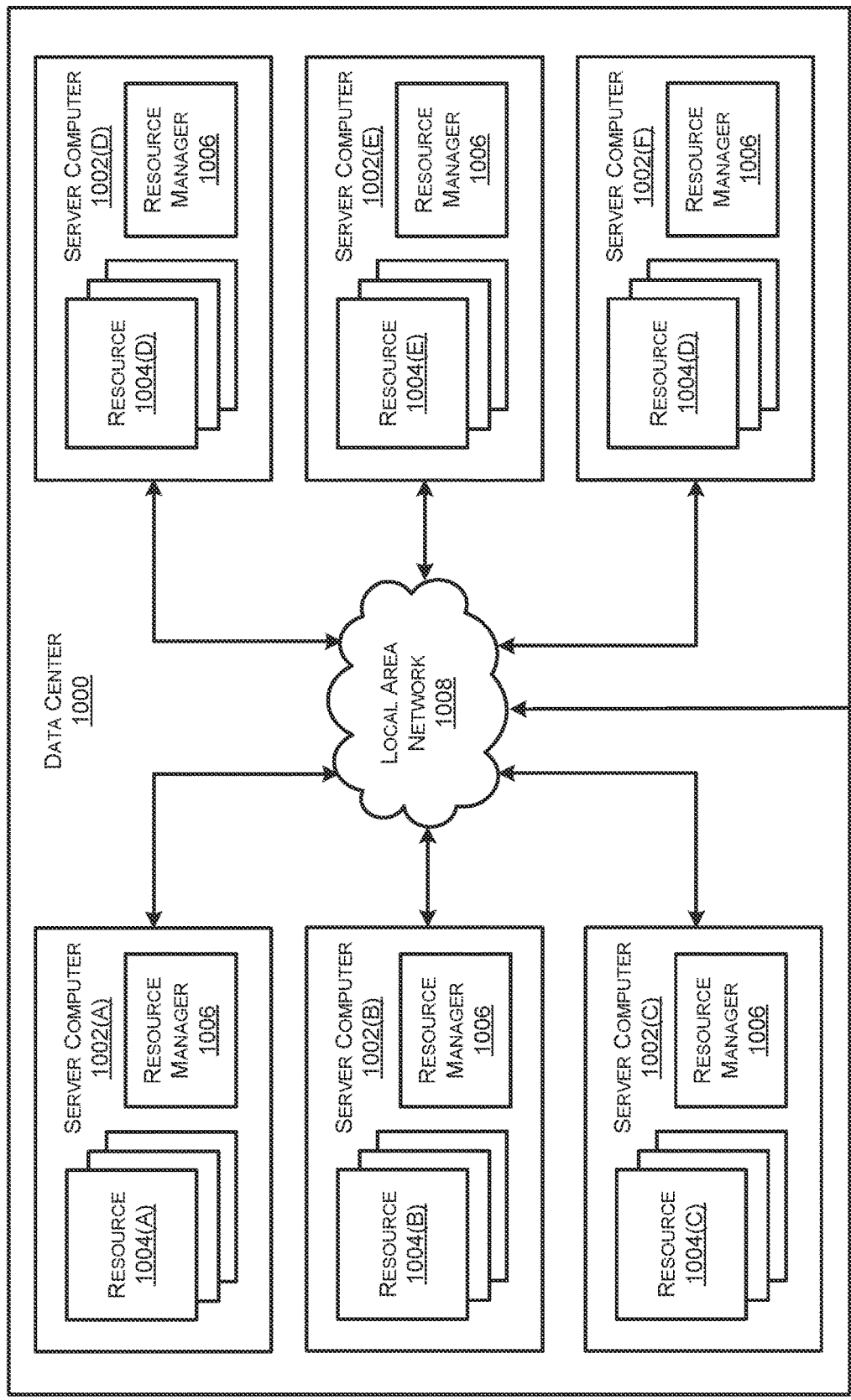
FIG. 10 illustrates a computing system diagram illustrating a configuration for a data center that may be utilized to implement aspects of the technologies disclosed herein.

FIG. 10 illustrates a computing system diagram illustrating a configuration for a data center 1000 that may be utilized to implement aspects of the technologies disclosed herein. The example data center 1000 shown in FIG. 10 includes several server computers 1002A-1002F (which might be referred to herein singularly as "a server computer 1002" or in the plural as "the server computers 1002) for providing computing resources. In some examples, the resources and/or server computers 1002 may include, or correspond to, any type of networked device described herein. Although described as servers, the server computers 1002 may comprise any type of networked device, such as servers, switches, routers, hubs, bridges, gateways, modems, repeaters, access points, etc.

The server computers 1002 may be standard tower, rack-mount, or blade server computers configured appropriately for providing computing resources. In some examples, the server computers 1002 may provide computing resources 1004 including data processing resources such as VM instances or hardware computing systems, database clusters, computing clusters, storage clusters, data storage resources, database resources, networking resources, virtual private networks (VPNs), and others. Some of the server computers 1002 may also be configured to execute a resource manager 1006 capable of instantiating and/or managing the computing resources. In the case of VM instances, for example, the resource manager 1006 may be a hypervisor or another type of program configured to enable the execution of multiple VM instances on a single server computer 1002. Server computers 1002 in the data center 1000 may also be configured to provide network services and other types of services.

In the example data center 1000 shown in FIG. 10, an appropriate LAN 1008 is also utilized to interconnect the server computers 1002A-1002F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 1000, between each of the server computers 1002A-1002F in each data center 1000, and, potentially, between computing resources in each of the server computers 1002. It may be appreciated that the configuration of the data center 1000 described with reference to FIG. 10 is merely illustrative and that other implementations may be utilized.

In some examples, the server computers 1002 and or the computing resources 1004 may each execute/host one or more tenant containers and/or virtual machines to perform techniques described herein.

In some instances, the data center 1000 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 1004 provided by the cloud computing network may include various types of computing resources, such as data processing resources like tenant containers and VM instances, data storage resources, networking resources, data communication resources, network services, VPN instances, and the like.

Each type of computing resource 1004 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 1004 not mentioned specifically herein.

The computing resources 1004 provided by a cloud computing network may be enabled in one example by one or more data centers 1000 (which might be referred to herein singularly as "a data center 1000" or in the plural as "the data centers 1000). The data centers 1000 are facilities utilized to house and operate computer systems and associated components. The data centers 1000 typically include redundant and backup power, communications, cooling, and security systems. The data centers 1000 may also be located in geographically disparate locations. One illustrative example for a data center 1000 that may be utilized to implement the technologies disclosed herein is described herein with regard to, for example, FIGS. 1 through 9.

Figure 11:
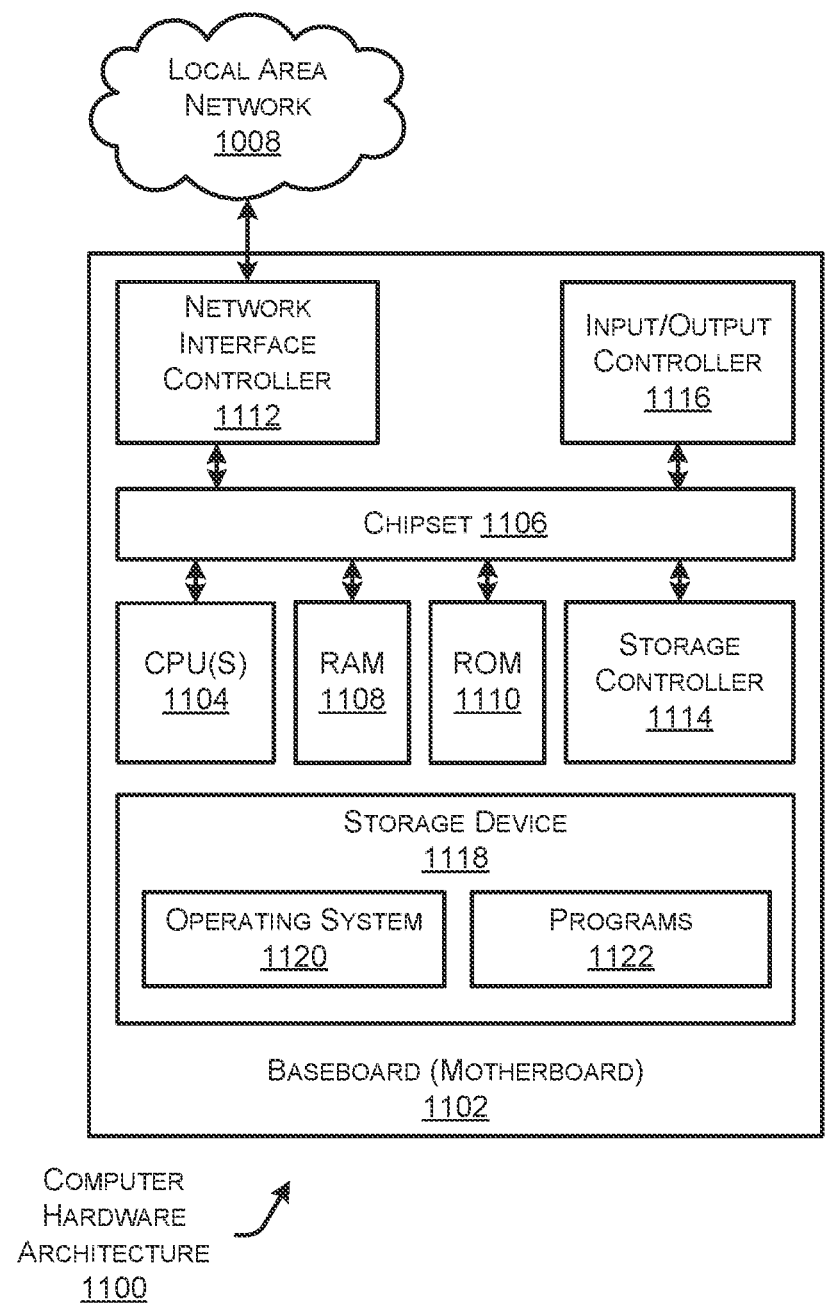
FIG. 11 illustrates a computer architecture diagram showing an example computer hardware architecture for implementing a computing device that may be utilized to implement aspects of the various technologies presented herein.

FIG. 11 illustrates a computer architecture diagram showing an example computer hardware architecture 1100 for implementing a computing device that may be utilized to implement aspects of the various technologies presented herein. The computer hardware architecture 1100 shown in FIG. 11 illustrates at least one device in the fabric 102 such as a router or a switch, the host 104, the NVMe storage controller 106, and/or other systems or devices associated with the NVMe/TCP SAN 300, 400, 500 and/or remote from the NVMe/TCP SAN 300, 400, 500, a workstation, a desktop computer, a laptop, a tablet, a network appliance, an e-reader, a smartphone, or other computing device, and may be utilized to execute any of the software components described herein. The computer 1100 may, in some examples, correspond to a network device (e.g., the fabric 102 such as a router or a switch, the host 104, the NVMe storage controller 106) described herein, and may comprise networked devices such as servers, switches, routers, hubs, bridges, gateways, modems, repeaters, access points, etc.

The computer 1100 includes a baseboard 1102, or "motherboard," which is a printed circuit board to which a multitude of components or devices may be connected by way of a system bus or other electrical communication paths. In one illustrative configuration, one or more central processing units (CPUs) 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a RAM 1108, used as the main memory in the computer 1100. The chipset 1106 may further provide an interface to a computer-readable storage medium such as a read-only memory (ROM) 1110 or non-volatile RAM (NVRAM) for storing basic routines that help to startup the computer 1100 and to transfer information between the various components and devices. The ROM 1110 or NVRAM may also store other software components necessary for the operation of the computer 1100 in accordance with the configurations described herein.

The computer 1100 may operate in a networked environment using logical connections to remote computing devices and computer systems through a network, such as the fabric 102 such as a router or a switch, the host 104, the NVMe storage controller 106, among other devices. The chipset 1106 may include functionality for providing network connectivity through a Network Interface Controller (NIC) 1112, such as a gigabit Ethernet adapter. The NIC 1112 is capable of connecting the computer 1100 to other computing devices within the NVMe/TCP SAN 300, 400, 500 and external to the NVMe/TCP SAN 300, 400, 500. It may be appreciated that multiple NICs 1112 may be present in the computer 1100, connecting the computer to other types of networks and remote computer systems. In some examples, the NIC 1112 may be configured to perform at least some of the techniques described herein, such as packet redirects and/or other techniques described herein.

The computer 1100 may be connected to a storage device 1118 that provides non-volatile storage for the computer. The storage device 1118 may store an operating system 1120, programs 1122 (e.g., any computer-readable and/or computer-executable code described herein), and data, which have been described in greater detail herein. The storage device 1118 may be connected to the computer 1100 through a storage controller 1114 connected to the chipset 1106. The storage device 1118 may consist of one or more physical storage units. The storage controller 1114 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 1100 may store data on the storage device 1118 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 1118 is characterized as primary or secondary storage, and the like.

For example, the computer 1100 may store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the storage device 1118 by detecting the physical states or characteristics of one or more particular locations within the physical storage units.

In addition to the storage device 1118 described above, the computer 1100 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 1100. In some examples, the operations performed by the fabric 102 such as a router or a switch, the host 104, the NVMe storage controller 106, and or any components included therein, may be supported by one or more devices similar to computer 1100. Stated otherwise, some or all of the operations performed by the fabric 102 such as a router or a switch, the host 104, the NVMe storage controller 106, and or any components included therein, may be performed by one or more computer devices operating in a cloud-based arrangement.

By way of example, and not limitation, computer-readable storage media may include volatile and non-volatile, removable, and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1118 may store an operating system 1120 utilized to control the operation of the computer 1100. According to one example, the operating system 1120 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 1118 may store other system or application programs and data utilized by the computer 1100.

In one example, the storage device 1118 or other computer-readable storage media is encoded with computer-executable instructions which, when loaded into the computer 1100, transform the computer from a general-purpose computing system into a special-purpose computer capable of implementing the examples described herein. These computer-executable instructions transform the computer 1100 by specifying how the CPUs 1104 transition between states, as described above. According to one example, the computer 1100 has access to computer-readable storage media storing computer-executable instructions which, when executed by the computer 1100, perform the various processes described above with regard to FIGS. 1 through 9. The computer 1100 may also include computer-readable storage media having instructions stored thereupon for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, an input/output controller 1116 may provide output to a display, such as a computer monitor, a flat-panel display, a digital projector, a printer, or other type of output device. It will be appreciated that the computer 1100 might not include all of the components shown in FIG. 11, may include other components that are not explicitly shown in FIG. 11, or might utilize an architecture completely different than that shown in FIG. 11.

As described herein, the computer 1100 may comprise one or more of the fabric 102 such as a router or a switch, the host 104, the NVMe storage controller 106, and/or other systems or devices associated with the NVMe/TCP SAN 300, 400, 500 and/or remote from the NVMe/TCP SAN 300, 400, 500. The computer 1100 may include one or more hardware processor(s) such as the CPUs 1104 configured to execute one or more stored instructions. The CPUs 1104 may comprise one or more cores. Further, the computer 1100 may include one or more network interfaces configured to provide communications between the computer 1100 and other devices, such as the communications described herein as being performed by the fabric 102 such as a router or a switch, the host 104, the NVMe storage controller 106, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1122 may comprise any type of programs or processes to perform the techniques described in this disclosure for the fabric 102 such as a router or a switch, the host 104, the NVMe storage controller 106 as described herein. The programs 1122 may enable the devices described herein to perform various operations.

CONCLUSION

The examples described herein provide systems, methods, and non-transitory computer-readable medium storing instructions that, when executed, provide a storage customized congestion mitigation scheme that may extract maximum I/O performance from an NVMe/TCP SAN. The systems, methods, and non-transitory computer-readable medium achieve these and other objectives with minimal alterations to NVMe and/or TCP layers of a network stack. The present systems, methods, and non-transitory computer-readable medium ensure that congestion mitigation actions at both the TCP layer (e.g., fabric congestion) and the NVMe layer (e.g., storage array congestion) are handled at the host (e.g., the UCS) which is the initiator of storage traffic in storage aware manner such that reads and writes from the host are bifurcated across the different layers of the network stack and congestion mitigation actions are taken independently for read and write depending on the type and direction of congestion detected.

Because TCP is a byte sequencing protocol and data is always sent in order, reads and writes cannot be reordered once it is enqueued into the TCP layer. Therefore, using a single TCP connection, it is not possible to change the order of read and writes based on congestion. Further, it is also preferable to avoid any customizations in the TCP layer since this TCP layer is shared across storage and non-storage traffic. The present systems, methods, and non-transitory computer-readable medium utilize two separate TCP connections between a host and controller for read and write, respectively. This allows independent actions to be taken for (1) storage controller congestion versus fabric congestion, and (2) Tx congestion from the host versus Rx congestion towards the host.

While the present systems, methods, and non-transitory computer-readable medium are described with respect to the specific examples, it is to be understood that the scope of the present systems, methods, and non-transitory computer-readable medium are not limited to these specific examples. Since other modifications and changes varied to fit particular operating requirements and environments will be apparent to those skilled in the art, the present systems, methods, and non-transitory computer-readable medium are not considered limited to the example chosen for purposes of disclosure and covers all changes and modifications which do not constitute departures from the true spirit and scope of the present systems, methods, and non-transitory computer-readable medium.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of congestion mitigation, comprising:
   determining whether a host is sending a read command or a write command to a non-volatile memory express (NVMe) controller;
   in response to a determination that the host is sending the read command, transmitting the read command via a first transmission control protocol (TCP) connection between the host and the NVMe controller; and
   in response to a determination that the host is sending the write command, transmitting the write command via a second TCP connection between the host and the NVMe controller.

2. The method of claim 1, further comprising:
   receiving an internet protocol (IP) header at the host in response to the write command;
   determining if an IP header includes a congestion encountered (CE) bit within an explicit congestion notification (ECN), the CE bit indicating congestion in a transmit (Tx) direction from the host; and
   throttling write inputs/outputs (I/Os) over the second TCP connection.

3. The method of claim 2, further comprising
   at a TCP layer of a network stack of the host, contracting a write TCP connection window size; and
   continuing to send additional read commands at a first pre-instructed rate.

4. The method of claim 3, further comprising:
   determining if the congestion in a Tx direction from the host has subsided; and
   in response to a determination that the congestion in the Tx direction from the host has subsided, restoring the write TCP connection window size to a pre-contracted state, processing additional write commands at a second pre-instructed rate, or combinations thereof.

5. The method of claim 1, further comprising:
   receiving an IP header at the host in response to the read command;
   determining if the IP header includes a CE bit within an ECN, the CE bit indicating congestion in a receive (Rx) direction towards the host; and
   throttling read I/Os over the first TCP connection.

6. The method of claim 5, further comprising
   at a TCP layer of a network stack of the host, sending instructions to the NVMe controller to contract a read TCP connection window size; and
   continuing to send additional write commands at a first pre-instructed rate.

7. The method of claim 6, further comprising:
   determining if the congestion in the Rx direction toward the host has subsided; and
   in response to a determination that the congestion in the Rx direction toward the host has subsided, restoring the read TCP connection window size to a pre-contracted state, processing additional read commands at a second pre-instructed rate, or combinations thereof.

8. A non-transitory computer-readable medium storing instructions that, when executed, causes a processor to perform operations, comprising:
   determining whether a host is sending a read command or a write command to a non-volatile memory express (NVMe) controller;
   in response to a determination that the host is sending the read command, transmitting the read command via a first transmission control protocol (TCP) connection between the host and the NVMe controller; and
   in response to a determination that the host is sending the write command, transmitting the write command via a second TCP connection between the host and the NVMe controller.

9. The non-transitory computer-readable medium of claim 8, the operations further comprising:
   receiving an internet protocol (IP) header at the host in response to the write command;
   determining if an IP header includes a congestion encountered (CE) bit within an explicit congestion notification (ECN), the CE bit indicating congestion in a transmit (Tx) direction from the host; and
   throttling write inputs/outputs (I/Os) over the second TCP connection.

10. The non-transitory computer-readable medium of claim 9, the operations further comprising:
    at a TCP layer of a network stack of the host, contracting a write TCP connection window size; and
    continuing to send additional read commands at a first pre-instructed rate.

11. The non-transitory computer-readable medium of claim 10, the operations further comprising:
    determining if the congestion in the Tx direction from the host has subsided; and
    in response to a determination that the congestion in the Tx direction from the host has subsided, restoring the write TCP connection window size to a pre-contracted state, processing additional write commands at a second pre-instructed rate, or combinations thereof.

12. The non-transitory computer-readable medium of claim 8, the operations further comprising:
    receiving an IP header at the host in response to the read command;
    determining if the IP header includes a CE bit within an ECN, the CE bit indicating congestion in a receive (Rx) direction towards the host; and
    throttling read I/Os over the first TCP connection.

13. The non-transitory computer-readable medium of claim 12, the operations further comprising:
    at a TCP layer of a network stack of the host, sending instructions to the NVMe controller to contract a read TCP connection window size; and continuing to send additional write commands at a first pre-instructed rate.

14. The non-transitory computer-readable medium of claim 13, the operations further comprising:
determining if the congestion in the Rx direction toward the host has subsided; and
in response to a determination that the congestion in the Rx direction toward the host has subsided, restoring the read TCP connection window size to a pre-contracted state, processing additional read commands at a second pre-instructed rate, or combinations thereof.

15. A system comprising:
a processor; and
a non-transitory computer-readable media storing instructions that, when executed by the processor, causes the processor to perform operations comprising:
determining whether a host is sending a read command or a write command to a non-volatile memory express (NVMe) controller;
in response to a determination that the host is sending the read command, transmitting the read command via a first transmission control protocol (TCP) connection between the host and the NVMe controller;
in response to a determination that the host is sending the write command, transmitting the write command via a second TCP connection between the host and the NVMe controller;
receiving a first internet protocol (IP) header at the host in response to the write command;
determining if the first IP header includes a first congestion encountered (CE) bit within a first explicit congestion notification (ECN), the first CE bit indicating congestion in a transmit (Tx) direction from the host;
throttling write inputs/outputs (I/Os) over the second TCP connection;
receiving a second IP header at the host in response to the read command;
determining if the second IP header includes a second CE bit within a second ECN, the second CE bit indicating congestion in a receive (Rx) direction towards the host; and
throttling read I/Os over the first TCP connection.

16. The system of claim 15, the operations further comprising:
at a TCP layer of a network stack of the host, contracting a write TCP connection window size;
continuing to send additional read commands at a first pre-instructed rate;
determining if the congestion in the Tx direction from the host has subsided; and
in response to a determination that the congestion in the Tx direction from the host has subsided, restoring the write TCP connection window size to a pre-contracted state, processing additional write commands at a second pre-instructed rate, or combinations thereof.

17. The system of claim 15, the operations further comprising:
at a TCP layer of a network stack of the host, sending instructions to the NVMe controller to contract a read TCP connection window size;
continuing to send additional write commands at a first pre-instructed rate;
determining if the congestion in the Rx direction toward the host has subsided; and
in response to a determination that the congestion in the Rx direction toward the host has subsided, restoring the read TCP connection window size to a pre-contracted state, processing additional read commands at a second pre-instructed rate, or combinations thereof.

18. The system of claim 15, wherein the read command and the write command are transmitted from the host to the NVMe controller via a fabric.

19. The system of claim 15, further comprising:
a plurality of write queues, the plurality of write queues partitioning the write command from a number of additional write commands; and
a plurality of read queues, the plurality of read queues partitioning the read command from a number of additional read commands.

20. The system of claim 15, the operations further comprising, at a block layer of a network stack, enqueuing the read command and the write command into separate QMaps.

* * * * *